US006727497B2

(12) United States Patent
Scalf et al.

(10) Patent No.: US 6,727,497 B2
(45) Date of Patent: Apr. 27, 2004

(54) CHARGE REDUCTION IN ELECTROSPRAY MASS SPECTROMETRY

(75) Inventors: Mark A. Scalf, Madison, WI (US); Lloyd M. Smith, Madison, WI (US); Michael S. Westphall, Madison, WI (US); Daniel D. Ebeling, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 331 days.

(21) Appl. No.: 09/815,929

(22) Filed: Mar. 23, 2001

(65) Prior Publication Data

US 2001/0035494 A1 Nov. 1, 2001

Related U.S. Application Data

(63) Continuation-in-part of application No. PCT/US99/21790, filed on Sep. 23, 1999.

(60) Provisional application No. 60/101,493, filed on Sep. 23, 1998.

(51) Int. Cl.[7] .......................... H01J 49/00; B01D 59/44

(52) U.S. Cl. ....................................... 250/288; 250/282

(58) Field of Search ................................ 250/288, 281, 250/282, 292

(56) References Cited

U.S. PATENT DOCUMENTS

| | | | |
|---|---|---|---|
| 3,683,212 A | 8/1972 | Zoltan | 310/8.3 |
| 3,857,049 A | 12/1974 | Zoltan | 310/8.1 |
| 4,352,570 A | 10/1982 | Firth | 366/127 |
| 4,461,155 A | 7/1984 | Werjefelt | 62/93 |
| 4,492,322 A | 1/1985 | Hieftje et al. | 222/420 |
| 4,546,253 A | 10/1985 | Tsuchiya et al. | 250/288 |
| 4,580,148 A | 4/1986 | Domoto et al. | 347/63 |
| 4,935,624 A | 6/1990 | Henion et al. | 250/288 |

(List continued on next page.)

FOREIGN PATENT DOCUMENTS

WO WO 00/17908 3/2000 ............ H01J/49/04

OTHER PUBLICATIONS

Allison, E.E. and Kendal, B.R.F. (Nov. 1996), "Cubic electrodynamic levitation trap with transparent electrodes," *Rev. Sci. Instrum.* 67(11):3806–3812.

Cooper, D.W. amd Reist, P.C. (Oct. 1973), "Neutralizing charged aerosols with radioactive sources," J. Colloid and Interface Sci. 45:17–26.

Dahnke, B. and Flachsbart, H. (1972), "An aerosol beam spectrometer," Aerosol Sci. 3:345–349.

Galley, P.J. and Hieftje, G.M. (1992), "Technique for producing capillaries with reproducible orifice diameters for uniform droplet generation," Applied Spectroscopy 46(10):1460–1463.

Hager, D.B. et al. (Nov. 1994), "Droplet electrospray mass spectrometry,"Anal. Chem. 66(22):3944–3949.

(List continued on next page.)

*Primary Examiner*—John R. Lee
*Assistant Examiner*—Paul M. Gurzo
(74) *Attorney, Agent, or Firm*—Greenlee, Winner and Sullivan, P.C.

(57) ABSTRACT

The charge state of ions produced by electrospray ionization is reduced in a controlled manner to yield predominantly singly charged ions through reactions with bipolar ions generated using a $^{210}Po$ alpha particle source or equivalent. The multiply charged ions generated by the electrospray undergo charge reduction in a charge reduction chamber. The charge-reduced ions are then detected using a commercial orthogonal electrospray TOF mass spectrometer, although the charge reduction chamber can be adapted to virtually any mass analyzer. The results obtained exhibit a signal intensity drop-off with increased oligonucleotide size similar to that observed with MALDI mass spectrometry, yet with the softness of ESI and without the off-line sample purification and pre-separation required by MALDI.

25 Claims, 13 Drawing Sheets

U.S. PATENT DOCUMENTS

| | | | | |
|---|---|---|---|---|
| 5,073,713 A | | 12/1991 | Smith et al. | 250/282 |
| 5,076,097 A | | 12/1991 | Zarrin et al. | 73/61.1 |
| 5,192,865 A | | 3/1993 | Zhu | 250/288 |
| 5,247,842 A | | 9/1993 | Kaufman et al. | 73/865.5 |
| 5,403,617 A | | 4/1995 | Haaland | 427/180 |
| 5,504,327 A | | 4/1996 | Sproch et al. | 250/288 |
| 5,565,677 A | | 10/1996 | Wexler et al. | 250/251 |
| 5,611,846 A | | 3/1997 | Overton et al. | 96/102 |
| 5,614,711 A | | 3/1997 | Li et al. | 250/287 |
| 5,750,988 A | | 5/1998 | Apffel et al. | 250/288 |
| 5,767,512 A | | 6/1998 | Eiden et al. | 250/282 |
| 5,838,002 A | * | 11/1998 | Sheehan | 250/288 |
| 5,873,523 A | | 2/1999 | Gomez et al. | 239/3 |
| 5,894,841 A | | 4/1999 | Voges | 128/203.12 |
| 5,922,976 A | | 7/1999 | Russell et al. | 73/865.5 |
| 5,925,732 A | | 7/1999 | Ecker et al. | 530/334 |
| 5,945,678 A | | 8/1999 | Yanagisawa | 250/423 |
| 5,973,904 A | | 10/1999 | Pui et al. | 361/225 |
| 5,992,244 A | | 11/1999 | Pui et al. | 73/865.5 |
| 6,027,699 A | | 2/2000 | Holcomb et al. | 422/186.04 |
| 6,051,189 A | | 4/2000 | Wick et al. | 422/82.01 |
| 6,093,557 A | | 7/2000 | Pui et al. | 435/173.1 |
| 6,277,334 B1 | | 8/2001 | Ecker et al. | 422/131 |
| 6,278,111 B1 | | 8/2001 | Sheehan et al. | 250/288 |
| 6,331,702 B1 | | 12/2001 | Krutchinsky et al. | 250/281 |
| 2001/0028866 A1 | | 10/2001 | Ecker et al. | 422/131 |
| 2001/0030285 A1 | | 10/2001 | Miller et al. | 250/288 |
| 2002/0011562 A1 | | 1/2002 | Park | 250/288 |

OTHER PUBLICATIONS

He, L. and Murray, K. (1999), "337 nm Matrix–assisted Laser Desorption/Ionization of Single Aerosol Particles," J. Mass Spectrom., 34:909–914.

Karas et al., (1988), "Laser desorption ionization of proteins with molecular masses exceeding 10,000 daltons," Anal. Chem. 60:2299–2306.

Karas et al. (1987), "Matrix–assisted ultraviolet laser desorption of non–volatile compounds," Int. J. Mass Spectrometry, Ion Proc., 78:53–68.

Kim, T. et al. (May 2000), "Design and implementation of a new electrodynamic ion funnel," Anal. Chem. 72(10):2247–2255.

Kim, T. et al. (Oct. 2000), "Improved ion transmission from atmospheric pressure to high vacuum using a multicapillary inlet and electrodynamic ion funnel interface," Anal. Chem. 72(20):5014–5019.

Kung, C–y et al. (Mar. 1999), "Single–molecule analysis of ultradilute solutions with guided streams of 1–μm water droplets," Applied Optics 38(9):1481–1487.

Liu, P. et al. (1995), "Generating particle beams of controlled dimensions and divergence: II. Experimental evaluation of particle motion in aerodynamic lenses and nozzle expansions," Aersol Sci. and Tech. 22:314–324.

Liu, P. et al. (1995), "Generating particle beams of controlled dimensions and divergence: I. Theory of particle motion in aerodynamic lenses and nozzle expansions," Aerosol Sci. and Tech. 22:293–313.

Luginbuhl, Ph. et al. (May 2000), "Femtoliter injector for DNA mass spectrometry," Sensors and Actuators B 63:167–177.

Miliotis, T. et al. (Mar. 2000), "Capillary liquid chromatography interfaced to matrix–assisted laser desorption/ionization time–of–flight mass spectrometry using an on–line coupled piezoelectric flow–through microdispenser," J. Mass Spectrometry 35:369–377.

Shaw, R.A. et al. (Oct. 1999), "An electrodynamic levitation system for studying individual cloud particles under upper–tropospheric conditions," J. Atmospheric and Oceanic Tech. 17(7):940–948.

Smith, L.M. (Sept. 1996), "Sequence from spectrometry: a realistic prospect?", Nature Biotechnology 14:1064–1065.

Switzer, G.L. (Nov. 1991), "A versatile system for stable generation of uniform droplets," Rev. Sci. Instrum. 62(11):2765–2771.

Mouradian, S. (Jan. 1998) "Separation and Detection of Nucleic Acids," Ph.D. Thesis, Chemistry, University of Wisconsin–Madison.

Cooper, D.W. and Reist, P.C. (Oct. 1973), "Neutralizing Charged Aerosols with Radioactive Sources," *J. Colloid and Interface Sci.* 45:17–26.

Chen et al. (1995), "Electrospraying of Conducting Liquids for Monodisperse Aerosol Generation in the 4 nm TO 1.8 μm Diameter Range," *J. Aerosol. Sci.* 26:963–977.

Cheng et al. (1995), "Charge State Reduction of Oligonucleotide Negative Ions from Electrospray Ionization," *Anal. Chem.* 67: 586–593.

Ebeling, D. (Mar. 2000), "Development of Corona Discharge Charge Reduction Electrospray Mass Spectrometry for Analysis of DNA Sequencing Reactions," Research Proposal, University of Wisconsin–Madison, 15pp.

Feng, X. and Agnes, G.R. (May 2000), "Single Isolated Droplets With Net Charge as a Source of Ions," *Amer. Soc. Mass Spec.* 11:393–399.

Fenn et al. (Oct. 1989), "Electrospray Ionization for Mass Spectrometry of Large Biomolecules," *Science* 246:64–70.

Fenn et al. (1990), "Electrospray ionization–principles and practice," *Mass Spec. Rev.* 9:37–70.

Georghiou et al. (1999), "Characterization of point–plane corona in air at radio frequency using a FE–FCT method," *J. Phys. D: Appl. Phys.* 32:2204–2218.

Griffey et al. (1997), "Oligonucleotide Charge States in Negative Ionization Electrospray–Mass Spectrometry Are a Function of Solution Ammonium Ion Concentration," *J. Am. Soc. Mass Spectrom.* 8:155–160.

Huang et al. (Jul. 1990), "Atmospheric Pressure Ionization Mass Spectrometry," *Anal. Chem.* 62(13):A713–725.

Kaufman et al. (Jun. 1996), "Macromolecule Analysis Based on Electrophoretic Mobility in Air: Globular Proteins," *Anal. Chem.* 68:1895–1904.

Kaufman et al. (1996), "Macromolecule Analysis Based on Electrophoretic Mobility In Air," Anal. Chem. 68:3703.

Kaufman, S.L. (1997), "TSI Working Prototype GEMMA* Macromolecule Analyzer," *TSI Incorporated Advanced Technology Group*.

Kaufman, S.L. (1998), "Analysis of Biomolecules Using Electrospray and Nanoparticle Methods: The Gas–Phase Electrophoretic Mobility Molecular Analyzer (GEMMA)," *J. Aerosol. Sci.* 29(5,6):537–552.

Kaufman et al. (1998), "Analysis of a 3.6–MDa Hexagonal Bilayer Hemoglobin from *Lumbricus terrestris* Using a Gas–Phase Electrophoretic Mobility Molecular Analyzer," *Anal. Biochem.* 259:195–202.

Kaufman, S.L. (Feb. 2000), "Electrospray diagnostics performed by using sucrose and proteins in the gas–phase electrophoretic mobility molecular analyzer (GEMMA)," *Anal. Chim Acta* 406:3–10.

Limbach, P.A. (1996), "Indirect Mass Spectrometric Methods for Characterizing and Sequencing Oligonucleotides," *Mass Spec. Rev.* 15: 297–336.

Mann et al. (1989), "Interpreting Mass Spectra of Multiply Charged Ions," *Anal. Chem.* 61:1702–1708.

McLuckey et al. (Mar. 1998) "Ion/Ion Proton–Transfer Kinetics: Implications for Analysis of Ions Derived from Electrospray of Protein Mixtures," *Anal. Chem.* 70:1198–1202.

Mouradian et al. (Mar. 1997), "DNA Analysis Using an Electrospray Scanning Mobility Particle Sizer," *Anal. Chem.* 69:919–925.

Ogorzalek et al. (1992), "A New Approach for the Study of Gas–Phase Ion–Ion Reactions Using Electrospray Ionization," *J. Am. Soc. Mass Spectrom.* 3:695–705.

Sarkissian et al. (Oct. 2000), "Measurement of Phenyllactate, Phenylacetate, and Phenylpyruvate by Negative Ion Chemical Ionization–Gas Chromatography/Mass Spectrometry in Brain of Mouse Genetic Models of Phenylketonuria and Non–Phenylketonuria Hyperphenylalaninemia," *Anal. Biochem.* 280 :242–249.

Scalf et al. (Jan. 2000), "Charge Reduction Electrospray Mass Spectometry," *Anal. Chem.* 72:52–60.

Scalf et al. (Jan. 1999), "Controlling Charge States of Large Ions," *Science* 283: 194–197.

Smith et al. (May 1990), "New Developments in Biochemical Mass Spectometry: Electrospray Ionization," *Anal. Chem.* 62:882–899.

Smith et al. (1991). "Principles and practice of electrospray ionization–mass spectrometry for large polypeptides and proteins," *Mass Spectrom. Rev.* 10:359–451.

Stephenson, J.L. and McLucky, S.A. (Nov. 1996), "Ion/Ion Proton Transfer Reactions for Protein Mixture Analysis," *Anal. Chem.* 68:4026–4032.

Stephenson, J.L. and McLucky, S.A. (Sep. 1998), "Simplification of Product Ion Spectra Derived from Multiply Charged Parent Ions via Ion/Ion Chemistry," *Anal. Chem.* 70:3533–3544.

Stephenson, J.L. and McLucky, S.A. (1998), "Charge Manipulation for Improved Mass Determination of High–mass Species and Mixture Components by Electrospray Mass Spectrometry," *J. Mass Spectrom.* 33:664–672.

TSI Incorporated, Particle Instrument Division, (1999) "GEMMA* Method for Macromolecule/Nanoparticle Analysis," [online], [retrieved on May 13, 2000], retrieved from the internet: <http://www.tsi.com/particle/product/gemma/gemma.html>.

TSI Incorporated Particle Instruments, (1998), "Model 3480 Electrospray Aerosol Generator,".

TSI Incorporated Particle Instruments, (1999), "Model 3800 Aerosol Time–of–Flight Mass Spectrometer,".

Wang, H. and Hackett, M. (Jan. 1998), "Ionization within a Cylindrical Capacitor: Electrospray without an Externally Applied High Voltage," *Anal. Chem.* 70:205–212.

* cited by examiner

FIG. 3
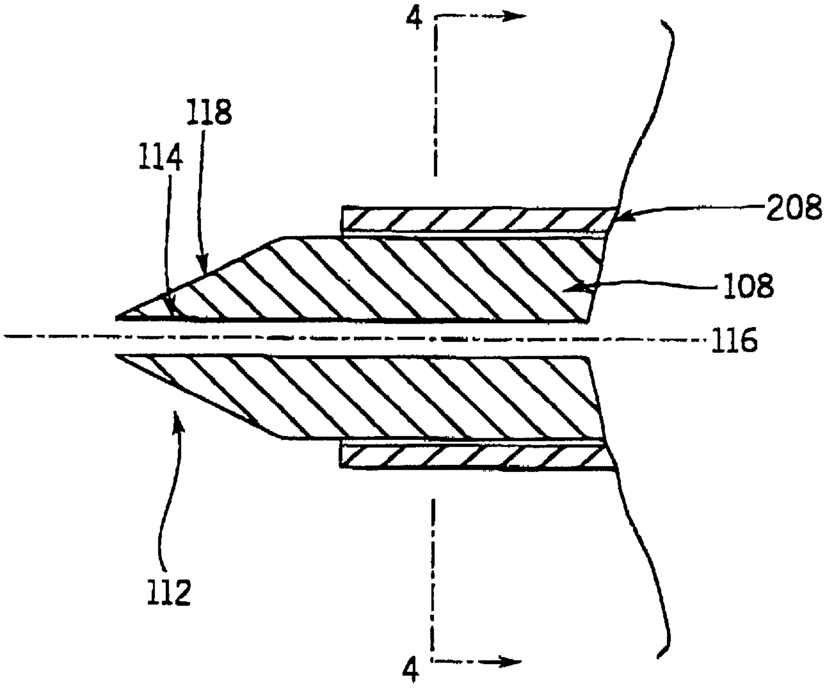
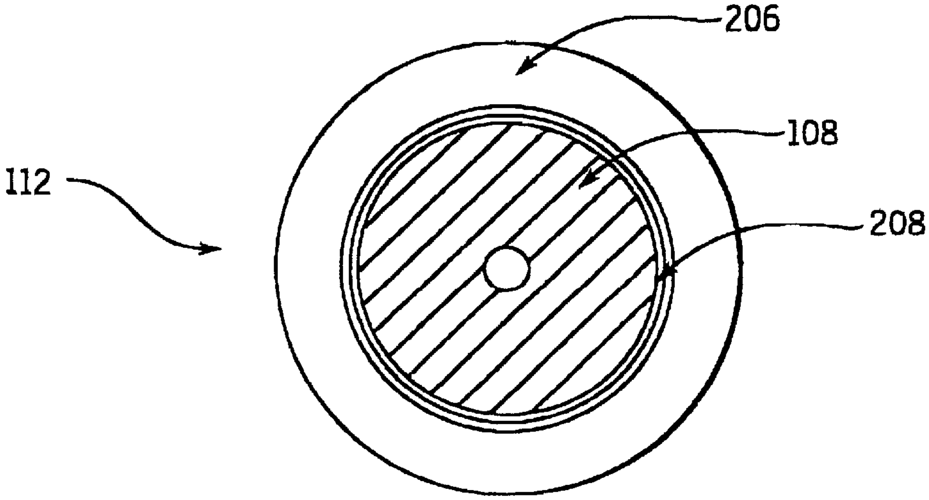
FIG. 4

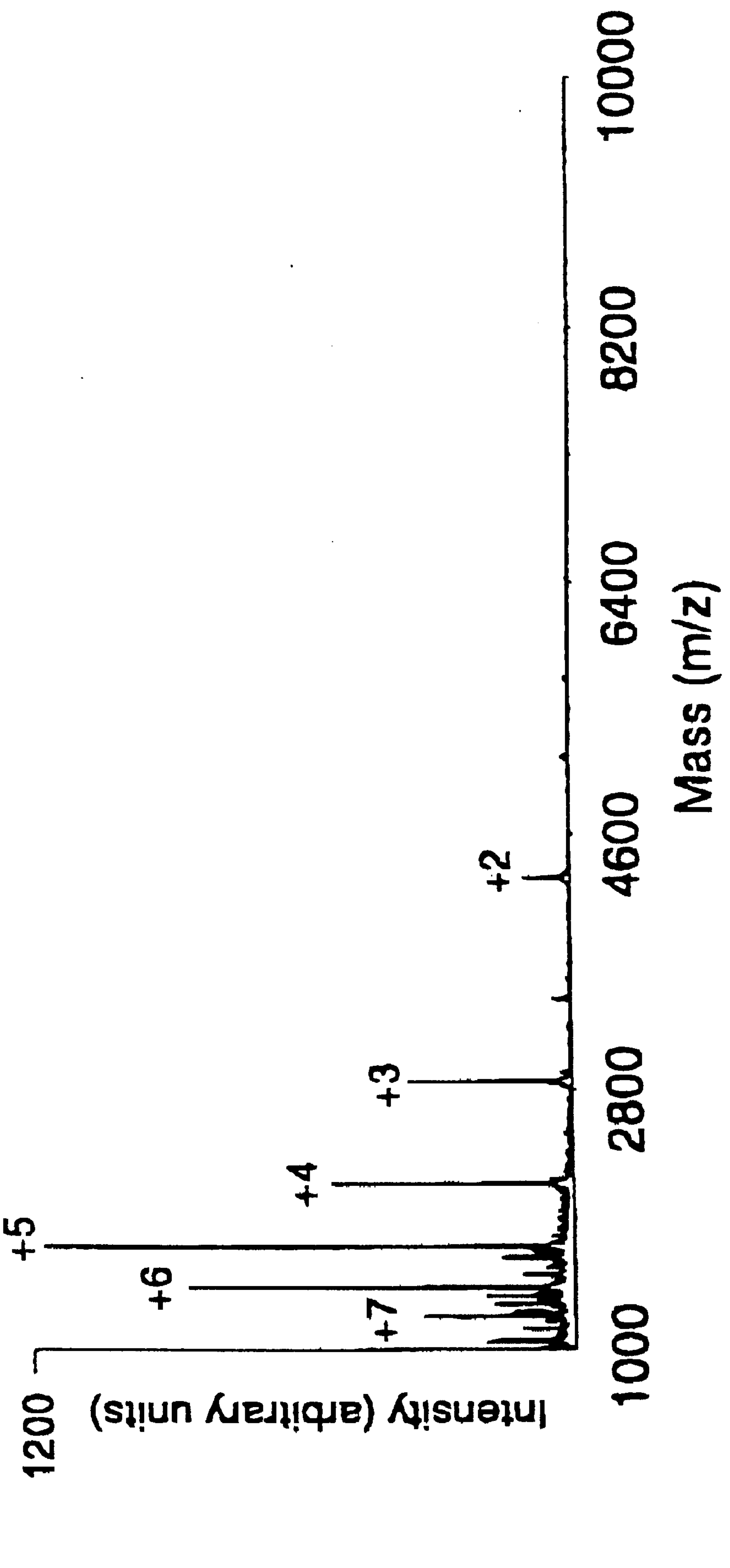
FIG. 6-A

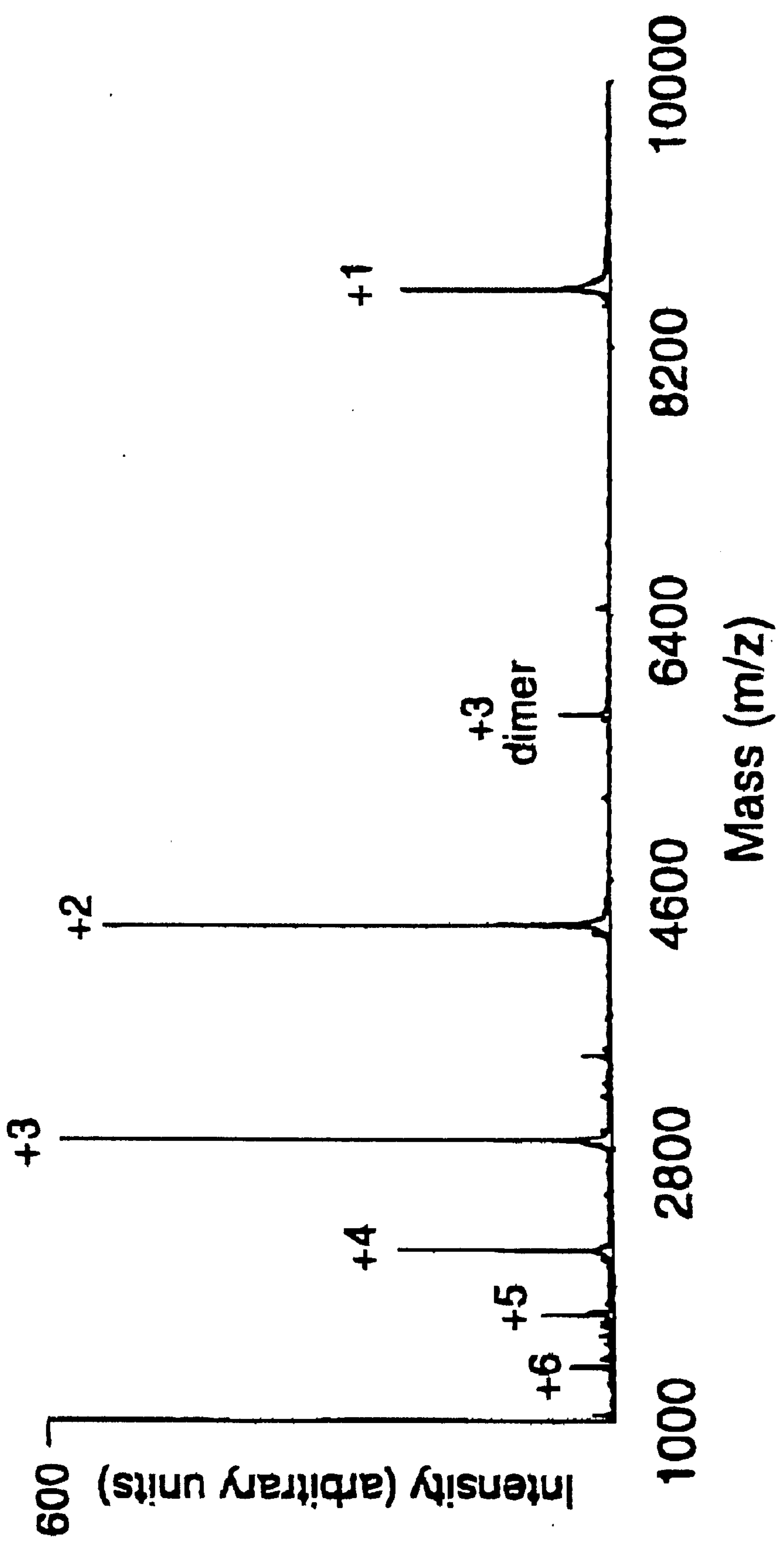
FIG. 6-B

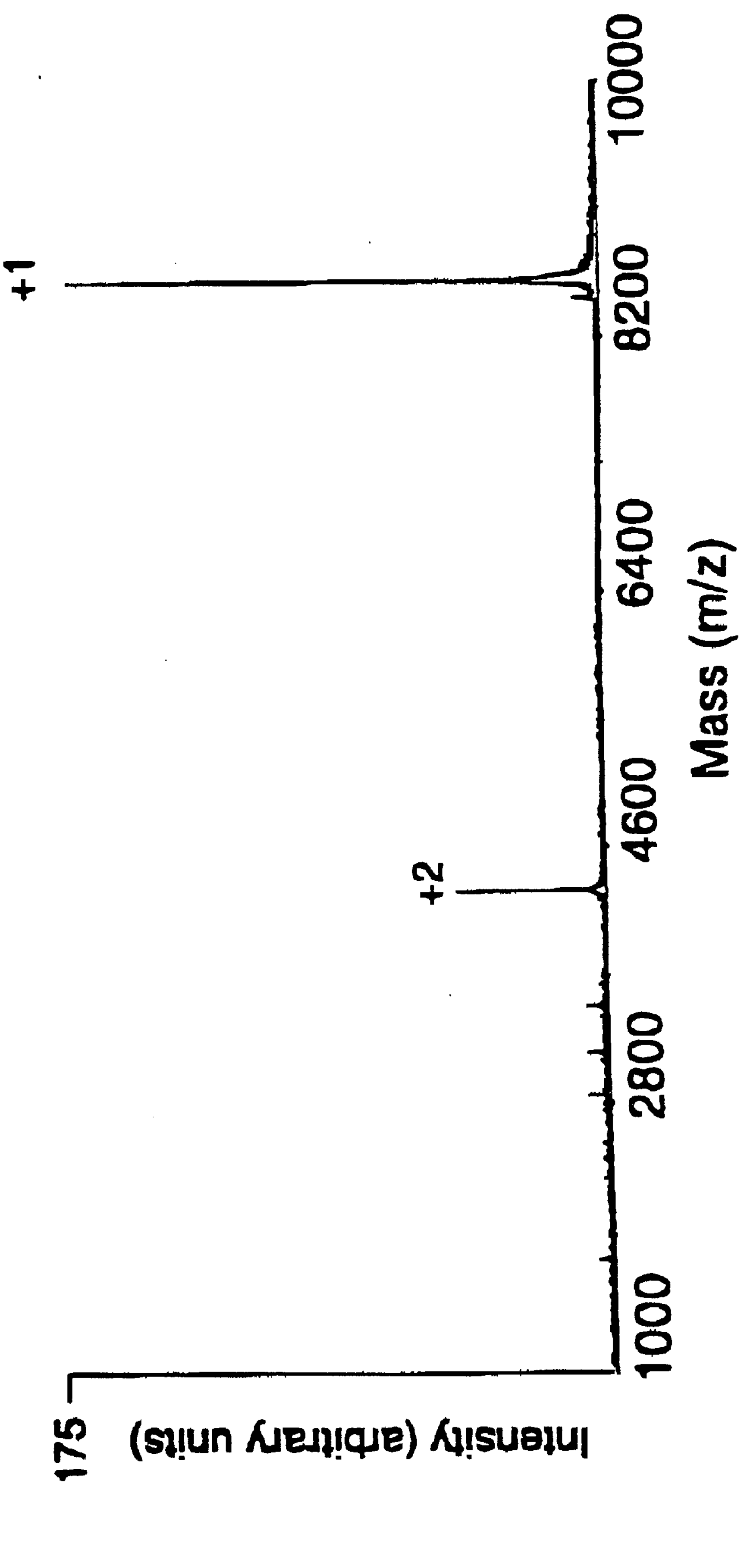
FIG. 6-C

FIG. 7-A
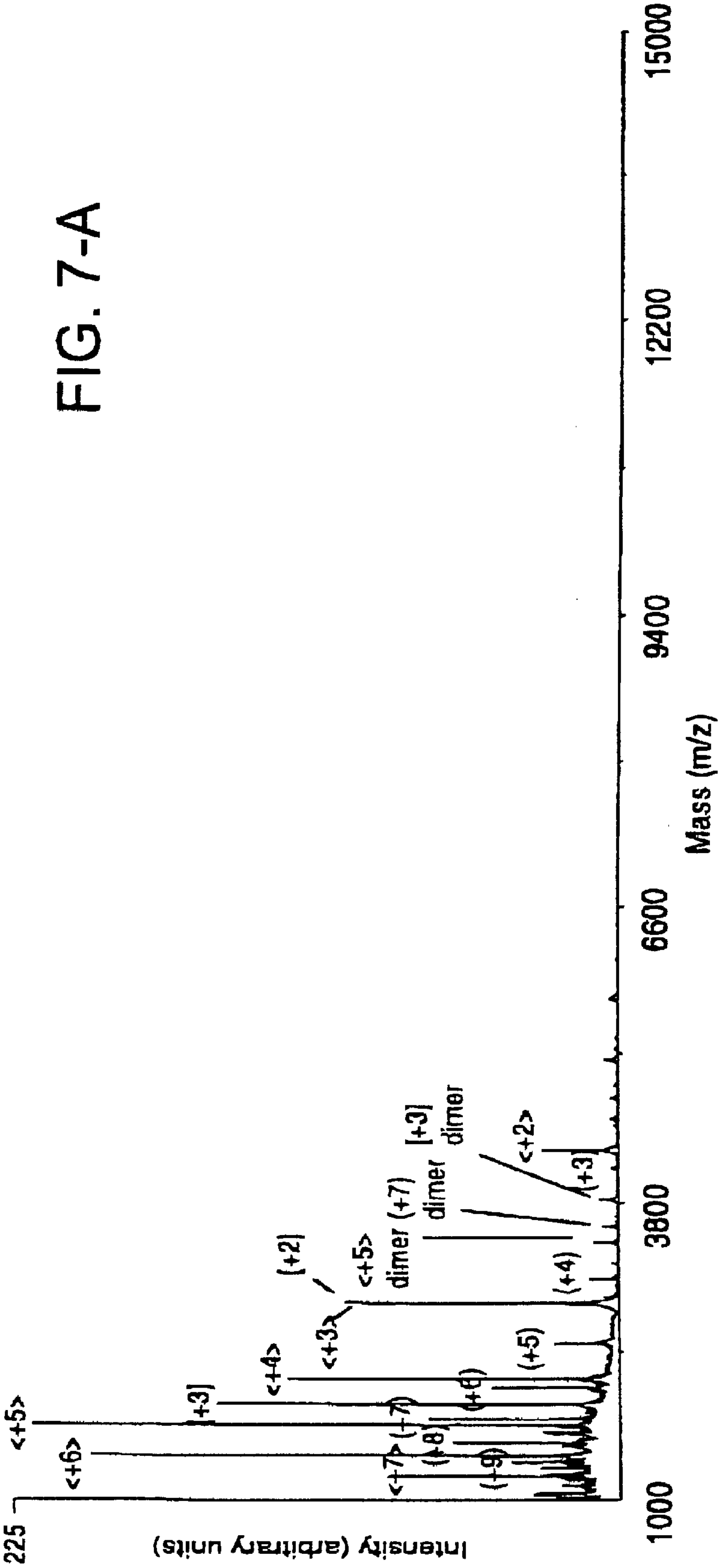

FIG. 7-B
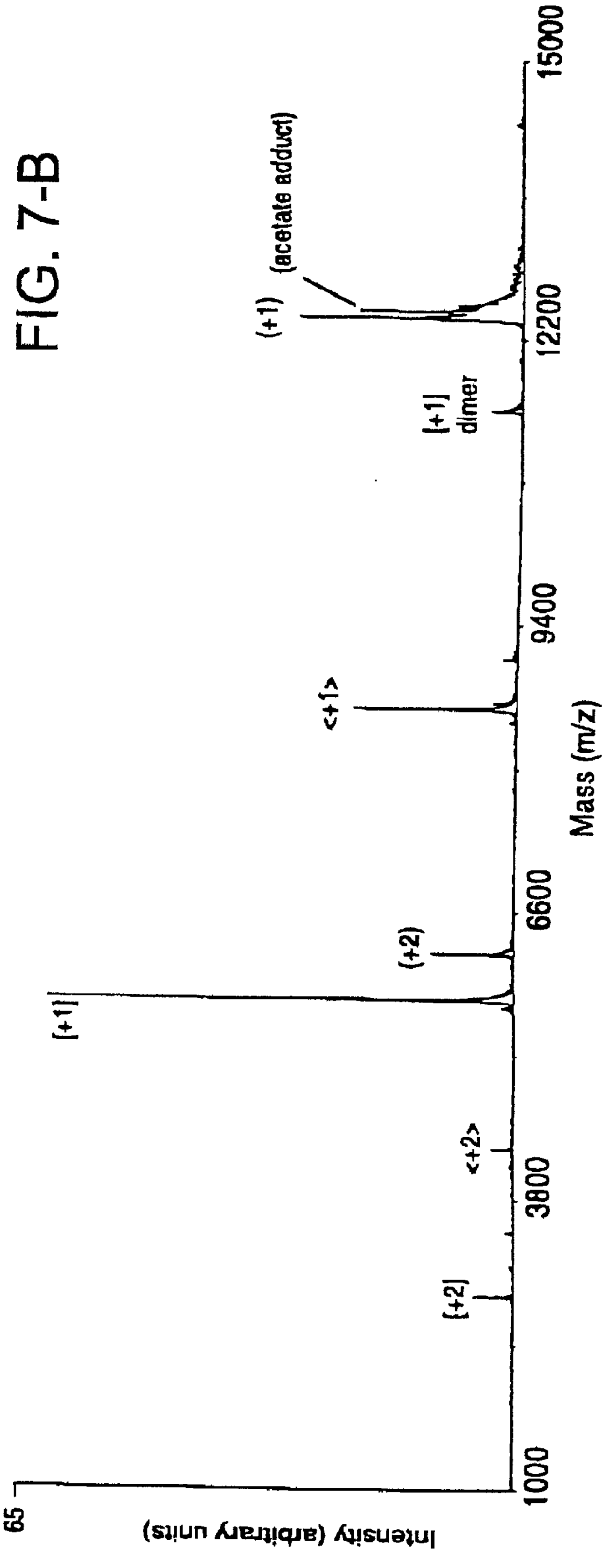

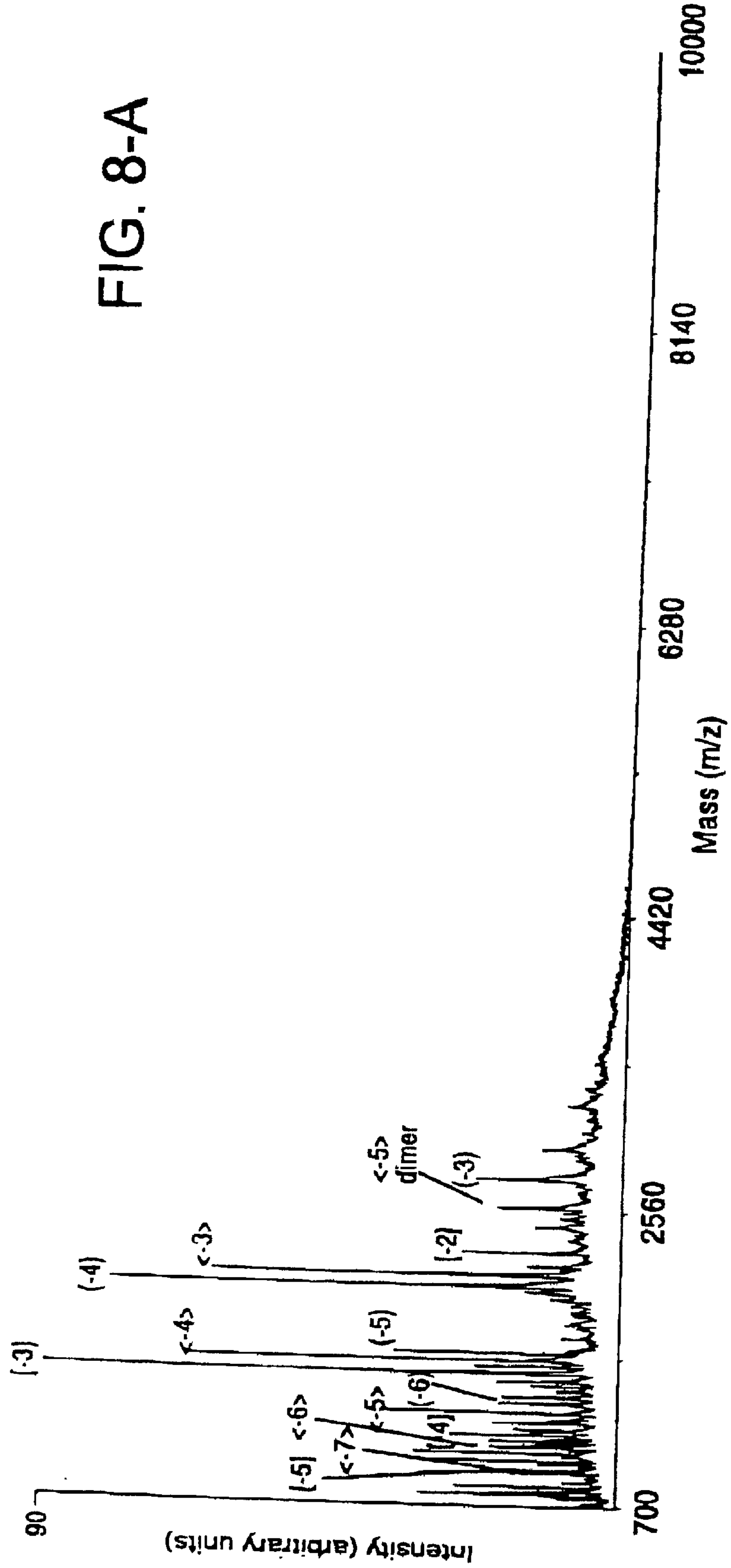
FIG. 8-A

FIG. 8-B
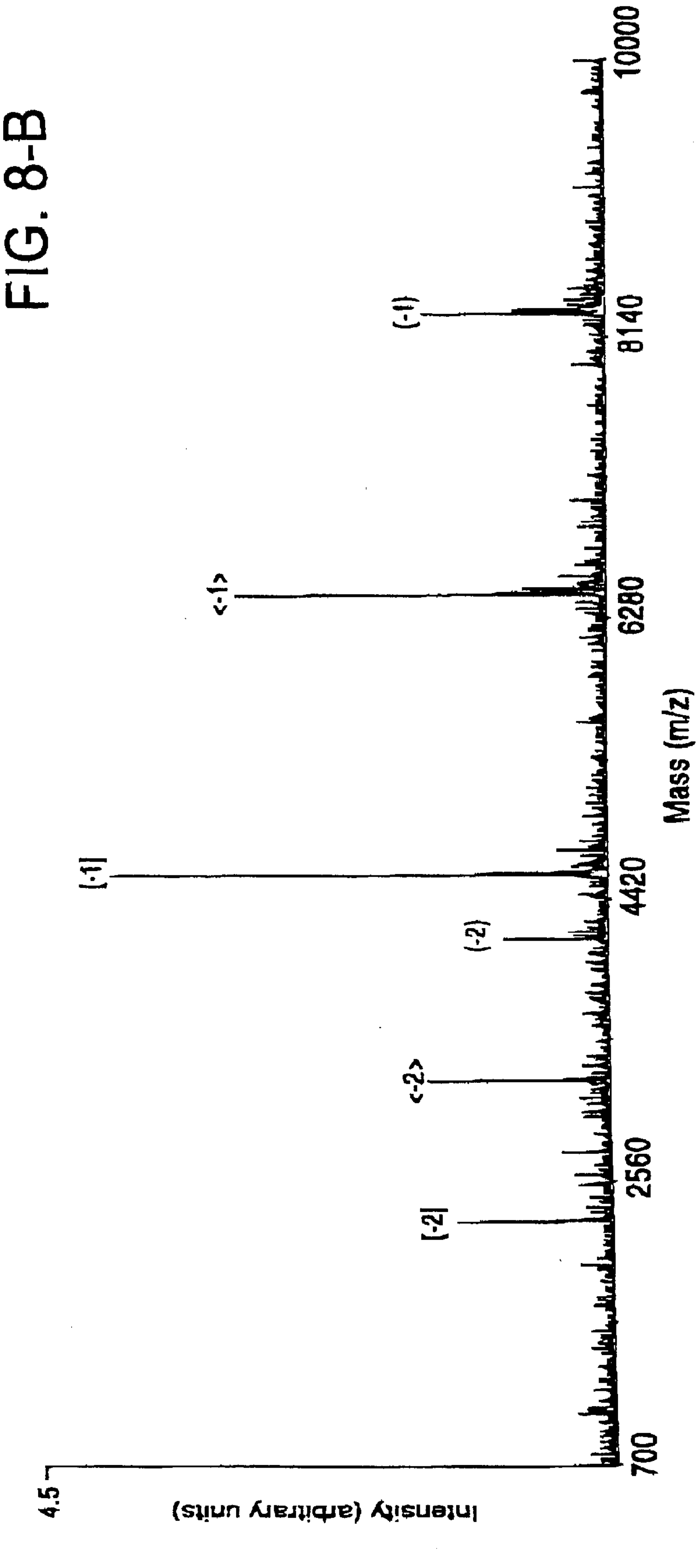

CHARGE REDUCTION IN ELECTROSPRAY MASS SPECTROMETRY

This application is a continuation-in-part of International Application No. PCT/US99/21790, filed Sep. 23, 1999, which claims the benefit of U.S. Provisional Application No. 60/101,493, filed Sep. 23, 1998, both of which are incorporated by reference in their entireties to the extent not inconsistent herewith.

BACKGROUND OF THE INVENTION

1. Field of the Invention

The present invention relates to electrospray ionization mass spectrometry, and more particularly to a method of charge reduction whereby ions produced by electrospray are amenable to partial neutralization and subsequent detection by an orthogonal time-of-flight mass spectrometer to yield high resolution mixture spectra.

2. Description of Related Art

The structure of deoxyribonucleic acid (DNA) consists of two parallel strands connected by hydrogen bonding. Double stranded DNA molecules assume a double helix structure with varying geometric characteristics. Under certain salt or temperature conditions, denaturation can occur and the two DNA strands become separated.

The order of nucleotides along a single strand corresponds to the sequence of DNA. Each set of three contiguous bases (a codon) encodes a particular amino acid used in protein synthesis. Successive codons are organized into a gene to encode a particular protein. DNA is thus present in living cells as the fundamental genetic information carrier.

The human genome is the complete set of human DNA present in every cell (apart from reproductive and red blood cells). It is believed that total human DNA comprises 3 billion base pairs encoding about 100,000 genes. Sequencing the entire genome is desirable because knowledge of gene sequencing should increase the understanding of gene regulation and function and allow precise diagnostics and treatment of genetic diseases.

Using current sequencing technologies, about 14,000 base pairs can be acquired in 14 hours in an electrophoresis gel. The ultimate goal of 3 billion base pairs therefore poses a technological challenge and presents a need for high performance sequencing instruments. To this end, mass spectrometry can be used as a sequencing technique.

An important field emerging from genomics is proteomics. Proteomics concerns the study of all the proteins encoded for by genes. Like genomics, proteomics involves extremely complex mixtures of large biopolymers (proteins in this case) that need to be separated and identified. Current technologies mainly make use of 2-D electrophoresis gels, which separate proteins based on both size and the isolelectric point of the proteins. These gels are labor intensive to prepare and time-consuming to run and analyze. Mass spectrometry offers a high-speed, high-sensitivity, low-labor alternative to separate, sequence, and identify complex mixtures of proteins.

Mass spectrometry allows the acquisition of molecular weights (measured in daltons) for every mass to charge (m/z) peak acquired, whereby the m/z ratio is an intrinsic and condition-independent property of an ion. By eliminating the preparation of gels required with electrophoretic mobility analysis, mass spectrometry has the potential for requiring only milliseconds per analysis. By its nature, it is an intrinsically fast and accurate means for accurately assessing molecular weights.

Mass spectrometry requires that the analyte of interest be produced in the form of a gas phase ion, within the vacuum of a mass spectrometer for analysis. While achieving this is straightforward for small molecules using classical techniques (such as sublimation or thermal desorption) used in conjunction with an ionization method (such as electron impact), it is much less straight-forward for large biopolymers with essentially nonexistent vapor pressures. For this reason, the field of large-molecule mass spectrometry was extremely limited for many years. This situation changed dramatically with the discovery of two important new techniques for producing ions of large biomolecules (macromolecules), namely Matrix Assisted Laser Desorption-lonization (MALDI) and Electrospray Ionization (ESI), whereby rapidly determining the mass of large molecules became feasible.

In MALDI mass spectrometry, a few hundred femtomoles of analyte are mixed on a probe tip with a small, organic, ultra-violet (UV) absorbing compound, the matrix. The analyte-matrix is dried to produce a heterogenous crystalline dispersion, and then irradiated with a brief (i.e., 10 ns) pulse of UV laser radiation in order to volatilize the sample and produce gas phase ions of the analyte amenable to mass spectrometric analysis. Because the UV pulse is at a wavelength that is absorbed by the matrix and not the analyte, the matrix is vaporized, and analyte molecules become entrained in the resultant gas phase plume where they are ionized in gas phase proton transfer reactions. However, analyte fragmentation and poorly understood matrix effects occur during the MALDI process, thereby reducing molecular ion intensity and complicating the analysis and interpretation of the mass spectra. As a result, the mass range of this technique is limited; it frequently does not allow sequencing fragments longer then 35–100 base pairs in length.

Electrospray ionization mass spectrometry (ESI-MS), on the other hand, allows analysis of DNA with reduced fragmentation. ESI-MS is characterized by a gentle analyte desorption process that can leave noncovalent bonds intact. This soft ionization allows analysis of intact DNA molecular ions. However, ESI-MS typically produces multiply charged ions, and as the number of possible charge states increases with the size of the analyte, this technique yields complex spectra for large molecules. For example, while ESI analysis of simple molecules may be accomplished using computer algorithms that transform the multiply charged mass spectra to "zero-charge" spectra, permitting easy visual interpretation thereof, as spectral complexity and chemical noise levels increase, these algorithms produce artificial peaks and miss analyte peaks with low signal intensity. Furthermore, each analyte yields a specific peak distribution and mixture spectra are therefore characterized by complex overlapping distributions for which the resultant spectra cannot be resolved without expensive high resolution mass spectrometers. This multiple charging and peak multiplicity in ESI-MS considerably limit the utility of this technique in the analysis of mixtures such as DNA sequencing ladders or complex protein mixtures, and serious efforts to utilize ESI-MS as a sequencing tool have thus been hampered by the complexity of the resultant mass spectra.

To make ESI-MS more effective, it is desirable to decrease the charge state of electrospray generated ions. Previous approaches to charge reduction in ESI have fallen into two major categories: modification of the solution conditions (i.e., buffer, pH, salts) and utilization of gas-phase reactions within an ion trap spectrometer. Altering solution conditions does not allow predictable and controllable manipulation of the charge state for all species present in a given mixture. With conventional ion trap techniques, the cation or anion used to reduce charge has to be "trapped" along with the analyte(s). This has the practical consequence of limiting the charge reduction to a narrow m/z range of ions. Thus, previous ion trap apparatuses are limited by the nature of the ion trap to a defined m/z range and are thus not amenable to the charge reduction of large m/z ions. This is of course critical for reducing the charge of large DNA molecules.

As is evident from the foregoing, a need exists for a method of combining the simplicity of singly charged species spectra with the softness of ESI to efficiently and effectively allow high resolution mass spectral analysis of a mixture of a sample analyte solution containing a macromolecule of interest in a solvent wherein the method used is not limited to a low m/z range and wherein off-line sample purification or pre-separation is not required.

BRIEF SUMMARY OF THE INVENTION

The method of the present invention enables mass spectral analysis of a solution containing a macromolecule of interest by preparing a sample analyte solution containing the macromolecule in a solvent, discharging, with assistance of a nebulizing gas, the analyte solution through an orifice held at a high voltage in order to produce a plurality of analyte droplets that are multiply charged, evaporating the solvent in the presence of a bath gas in order to provide a plurality of macromolecule particles having multiple charges, exposing the bath gas proximal to the macromolecule particles to a radioactive alpha-particle emitting source that ionizes elements of the bath gas into bipolar ions, controlling the interaction time between the macromolecule particles and the bipolar ions in order to reduce the multiply charged macromolecule particles to predominantly singly charged particles, and then analyzing the stream of singly charged macromolecule particles in a mass spectrometer.

More specifically, a sample analyte solution is placed into a vessel in an ESI source and discharged as an aerosol through an orifice held at a high potential. Due to a voltage differential between the spray tip orifice and the internal walls of the ESI source, an electrostatic field is created whereby charges accumulate at the surface of the emerging droplets. Charge reduction is achieved by exposure of the aerosol to a high concentration of bipolar ions (i.e., both positively and negatively charged ions present in the charge reduction chamber). Collisions between the charged aerosol and the bipolar ions in the bath gas result in the neutralization of the multiply charged electrospray ions. The rate of this process is controlled by varying the concentration of the bipolar ions in the bath gas and the degree of aerosol exposure to an ionization source such as Polonium ($^{210}Po$), a radioactive metallic element that emits alpha particles to form an isotope of lead. This provides, in effect, the ability to "tune" the charge state of the electrospray generated ions. A practical consequence is the ability to control the charge distribution of electrospray generated ions such that the ions can be manipulated to consist principally of singly charged ions and/or douly charged ions, thereby simplifying mass spectral analysis of DNA and protein mixtures.

By the disclosed method, the present inventors have succeeded in using an ESI-TOFMS (electrospray ionization-time of flight mass spectrometry) to analyze particles ranging from 4 to 8 kDa in size. In this technique, the particles in the continuous liquid flow from the electrospray source are desorbed and ionized. The resultant multiply charged species are then neutralized by passage through a neutralizing chamber whereby singly charged macromolecules result. As a result, the charge state of the ions generated in the electrospray chamber are reduced in a controlled manner whereby the stream of singly charged macromolecules are analyzed in a mass spectrometer such as an orthogonal time-of-flight (TOF) mass spectrometer, yielding high resolution mass spectra.

The method described herein decouples the ion production process from the neutralization process. This is important because it provides flexibility with respect to the electrospray conditions, which is critical to obtaining high-quality results, and it permits control over the degree of charge neutralization. In addition, with the approach presented here, the cation or anion used to reduce charge does not have to be "trapped" with the electrospray ions. This has the practical consequence of permitting the charge reduction to be performed on virtually any m/z ranges of ions, independent of the neutralizing cation or anion's m/z value. In addition, because a specific anionic or cationic species is not required in the method of this invention, switching between positive and negative modes of electrospray is straightforward. This allows protein cations to be neutralized in positive ion mode or DNA anions to be neutralized in negative ion mode without having to change any instrumental conditions other than operating polarity.

It is thus one object of this invention to allow rapid analysis of mixtures of synthetic or naturally occurring biopolymers with high m/z ranges for a wide range of applications. It is another object of the present invention to accomplish the above objective without requiring a major change in standard operational procedures. It is yet another objective of the present invention to accomplish the above objectives with a minimal cost adjustment over traditional ESI, thereby permitting accurate, high speed, high resolution, and low cost effective mass determinations of DNA macromolecules without requiring preparation of a mixture on a column or being subject to the limitations of traditional ion traps.

In an alternative embodiment, the present invention provides methods and devices for generating ions from liquid samples containing chemical species, including but not limited to chemical species with high molecular masses. In a preferred embodiment, the ion source of the present invention comprises a flow of bath gas that conducts the output of an electrically charged droplet source through a field desorption-charge reduction region cooperatively connected to the electrically charged droplet source and positioned at a selected distance downstream with respect to the flow of bath gas. The generation of electrically charged droplets in the present invention may be performed by any means capable of generating a continuous or pulsed stream of charged droplets from liquid samples containing chemical species. In an exemplary embodiment, an electrospray ionization charged droplet source is employed. Other electrically charged droplet sources useful in the present invention include but are not limited to: nebulizers, pneumatic nebulizers, thermospray vaporizers, cylindrical capacitor generators, atomizers, and piezoelectric pneumatic nebulizers.

First, the electrically charged droplet source generates a continuous or pulsed stream of electrically charged droplets by dispersing a liquid sample containing at least one chemical species in at least one solvent, carrier liquid or both into a flow of bath gas. Chemical species refers to a collection of one or more atoms, molecules and macromolecules and includes but is not limited to polymers such as peptides, oligonucleotides, carbohydrates, polysaccharides, glycoproteins and lipids. The droplets formed may possess either positive or negative polarity corresponding to the desired polarity of ions to be generated. Next, the stream of charged droplets and bath gas is conducted through a field desorption-charge reduction region wherein solvent and/or carrier liquid is removed from the droplets by at least partial evaporation to produce a flowing stream of smaller charged droplets and multiply charged gas phase analyte ions. Evaporation of positively charged droplets results in formation of gas phase analyte ions with multiple positive charges and evaporation of negatively charged droplets results in formation of gas phase analyte ions with multiple negative charges. Gas phase analyte ions refer to multiply charged ions, singly charged ions or both generated from chemical species in liquid samples. Gas phase analyte ions are positively charged, negatively charged or both and are characterized in terms of their charge-state distribution which is selectively adjustable in the present invention. Charge-state distribution refers to a two-dimensional representation of the number of ions of a given elemental composition that populate each ionic state present in a sample of ions.

Within the field desorption-charge reduction region, the stream of charged droplets, gas phase analyte ions or both are exposed to electrons and/or gas phase reagent ions of opposite polarity generated from bath gas molecules within at least a portion of the field desorption charge reduction region by a radioactive reagent ion source. In the present invention, the radioactive reagent ion source is operationally connected to the field desorption-charge reduction region to provide a flux of ionizing radiation into the field desorption-charge reduction region. Radioactive reagent ion sources of the present invention are any means capable of providing ionizing radiation to the field desorption-charge reduction region and include but are not limited to alpha particle emitters. In the present invention, ionizing radiation refers to α, β, γ or x-rays as well as protons, neutrons and other particles such as pions. In a preferred embodiment, the radioactive reagent ion source is a radio isotope source such as a $^{210}$Po radio isotope source or a $^{241}$Am radio isotope source. Reagent ions refer to a collection of gas phase ions of positive polarity, negative polarity or both that is generated upon ionization of bath gas molecules in at least part of the field desorption-charge reduction region by ionizing radiation generated by the radioactive reagent ion source. Optionally, reagent ions may refer to free electrons in the gas phase generated within the volume of the field desorption-charge reduction region by the flux of ionizing radiation generated by the radioactive reagent ion source. In a preferred embodiment, the reagent ions of the present invention comprise positively charged ions and negatively charge ions.

The radioactive reagent ion source is positioned at a selected distance downstream of the electrically charged droplet source and is configured in a manner to provide a source of ionizing radiation to at least a portion of the volume of the field desorption-charge reduction region. In a preferred embodiment, the flux of ionizing radiation into the field desorption-charge reduction region is selectively adjustable by use of a radiative flux attenuator element positioned between the field desorption-charge reduction region and the radioactive reagent ion source. Accordingly, the concentration and spacial distribution of reagent ions in the field desorption-charge reduction region may be selected by controlling the net flux and spacial characteristics of the output of the radioactive reagent ion source reaching the field desorption-charge reduction region. Control of the flux and spacial characteristic is provided by selectively adjusting the radiative flux attenuator element. The radiative flux attenuator element may comprise any means capable of reducing the flux of ionizing radiation into the field desorption region from the radioactive reagent ion source. In a preferred embodiment, the radiative flux attenuator element comprises at least one thin brass disc with a plurality of holes of known area drilled therein. In a more preferred embodiment, the holes drilled through the brass discs have an area of about 0.53 $cm^2$. In another preferred embodiment, the radiative flux attenuator element comprises at least one metal screen.

The charged droplets, analyte ions or both remain in the field desorption-charge reduction region for a selected residence time or dwell time. This time is controllable by selectively adjusting the flow rate of bath gas and/or the length of the field desorption-charge reduction region. Within at least a portion of the field desorption-charge reduction region, electrons, reagent ions or both, generated by the radioactive reagent ion source, react with charged droplets, analyte ions or both to reduce the charge-state distribution of the analyte ions in the flow of bath gas. Accordingly, ion-ion, ion-droplet, electron-ion and/or electron-droplet reactions result in the formation of gas phase analyte ions having a selected charge-state distribution. In a preferred embodiment, the ion source of the present invention generates an output of gas phase analyte ions comprising substantially of singly charged ions and/or doubly charged ions.

In a preferred embodiment, the charge state distribution of gas phase analyte ions is selectively adjustable by varying the interaction time between gas phase analyte ions and/or charged droplets and gas phase reagent ions and/or electrons. This may be accomplished by varying the residence time gas phase analyte ions spend in the field desorption-charge reduction region by either adjusting the flow rate of bath gases through the field desorption-charge reduction region or by varying the length and/or physical dimensions of the field desorption-charge reduction region. Longer residence times yield greater reduction in the analyte ion charge state distribution than shorter residence times. In addition, the charge-state distribution of gas phase analyte ions may be controlled by adjusting the rate of production of electrons, reagent ions in the field desorption-charge reduction regions. This may be accomplished by either increasing or decreasing the flux of ionizing radiation into the field desorption-charge reduction region. Higher production rates of reagent ions and/or electrons yield greater reagent ion and/or electron concentrations in the field deasorption-charge reduction region. Accordingly, higher production rates of reagent ions and/or electrons in the field desorption-charge reduction region yield a greater net extent of charge reduction than lower production rates. Further, an ion source of the present invention is capable of generating an output comprising analyte ions with a charge-state distribution that may be selected or may be varied as a function of time.

Optionally, the ion source of the present invention may be operationally coupled to a device capable of classifying and detecting charged particles such as a charged particle analyzer. Charged particle analyzer refers to any devices or techniques for determining the identity, properties or abundance of charged particles. This embodiment provides a method of determining the composition and identity of substances which may be present in a mixture. In an exemplary embodiment, the ion source of the present invention is coupled to a mass analyzer and provides a method of identifying the presence of and quantifying the abundance of analytes in liquid samples. In this embodiment, the output of the ion source is drawn into a mass analyzer to determine the mass to charge ratios (m/z) of the gas phase analyte ions generated from dispersion of the liquid sample into droplets followed by subsequent charge reduction. In an exemplary embodiment, the ion source of the present invention is coupled to a time of flight mass spectrometer to provide accurate measurement of m/z for compounds with molecular masses ranging from about 1 to about 30,000 amu. Other mass analyzers useful in the present invention include, but are not limited to, quadrupole mass spectrometers, tandem mass spectrometers, ion traps or combinations of these mass analyzers.

In the ion source of the present invention, the distance between the electrically charged droplet source and the radioactive reagent ion source is selectively adjustable. In a preferred embodiment, the charged droplet source and/or the radioactive reagent ion source is moveable along a central chamber axis to permit adjustment of this dimension. It is believed that variation of this distance affects the field desorption conditions and extent of field desorption achieved. Accordingly, changing the distance between the droplet source and the radioactive reagent ion source is expected to affect the total output of the ion source of the present invention. Larger distances between the droplet source and the radioactive reagent ion source tend to allow for a greater extent of field desorption than shorter distances and, hence, tend to result in greater net ion production. In addition, variation of the distance between the droplet source and the radioactive reagent ion source also affects field desorption conditions by changing the distribution of charge at the surface of the charged droplets. A smaller distance between droplet source and radioactive reagent ion source is expected to lead to greater reagent ion-charged droplet interaction, thereby attenuating the charge on the droplet's surface by charge scavenging. Scavenging of charge on the surface of the droplets is believed to have several effects on the field desorption process. First, charge scavenging may cause a net reduction in the extent and/or rate of field desorption of ions. Second, it may result in generation of analyte ions with a lower charge state distribution than that observed in the absence of charge scavenging. Finally, charge scavenging also tends to preserve the size distribution possessed by the electrically charged droplets upon discharge.

Alternatively, the ion source of the present invention includes embodiments comprising an electrically charged droplet source cooperatively connected to a field desorption region and a charge reduction region that are spatially separated from each other. Multiply charged droplets are generated by the electrically charged droplet source and conducted through a field desorption region by a flow of bath gas. In the separate field desorption region, solvent and/or carrier liquid is removed from the droplets by at least partial evaporation to produce a flowing stream of smaller charged droplets and multiply charged gas phase analyte ions. Evaporation of positively charged droplets results in formation of gas phase analyte ions with multiple positive charges and evaporation of negatively charged droplets results in formation of gas phase analyte ions with multiple negative charges. The charged droplets, analyte ions or both remain in the field desorption region for a selected residence time controllable by selectively adjusting the flow rate of bath gas and/or the length of the field desorption region.

Next, the stream of droplets, analyte ions or both is conducted through a separate charge reduction region operationally connected to the field desorption region and cooperatively connected to a radioactive reagent ion source. Within at least a portion of the charge reduction region, electrons, reagent ions or both, generated from bath gas molecules by ionizing radiation, react with charged droplets, analyte ions or both to reduce the charge-state distribution of the analyte ions in the flow of bath gas. Accordingly, ion-ion, ion-droplet, electron-ion and/or electron droplet reactions in the charge reduction region result in the formation of gas phase analyte ions having a selected charge-state distribution. In a preferred embodiment, the charge state distribution of gas phase analyte ions is selectively adjustable by varying the interaction time between gas phase analyte ions and/or charged droplets and the gas phase reagent ions and/or electrons.

In this alternative embodiment, field desorption and charge reduction regions may be housed in separate chambers or may merely be separated from each other by a distance large enough to provide a field desorption region substantially free of reagent ions. Ion sources with discrete field desorption and charge reduction regions are beneficial because they decouple ion formation and neutralization processes. Accordingly, experimental conditions may be optimized in the field desorption region to obtain high yields of gas phase analyte ions and experimental conditions may be independently optimized in the charge reduction region to yield the desired extent of charge reduction. This characteristic is beneficial because it provides flexibility with respect to the electrospray and field desorption conditions employable in the present invention. This flexibility facilitates obtaining high yields of singly and/or double charged analyte ions from hard to ionize species, such as polar species that do not ionize in solution.

The foregoing and other objects, advantages, and aspects of the present invention will become apparent from the following description. In the description, reference is made to the accompanying drawings which form a part hereof, and in which there is shown, by way of illustration, a preferred embodiment of the present invention. Such embodiment does not necessarily represent the full scope of the invention, however, and reference must also be made to the claims herein for properly interpreting the scope of this invention.

BRIEF DESCRIPTION OF THE SEVERAL VIEWS OF THE DRAWINGS

FIG. 3 is an exploded cross-sectional view of the spray tip of the capillary of the ESI source.

FIG. 4 is a front view of the spray tip of the capillary of the ESI source.

FIG. 6 depicts the effect of charge state reduction on ubiquitin as a function of exposed area of the alpha particle source, whereby FIG. 6-A shows mass spectra with the radioactive source 0% exposed, FIG. 6-B shows mass spectra with the radioactive source 17.5% exposed, and FIG. 6-C shows mass spectra with the radioactive source 100% exposed.

FIG. 7 depicts the effect of charge state reduction on a mixture of insulin, ubiquitin, and cytochrome c, whereby FIG. 7-A shows mass spectra without charge reduction and FIG. 7-B shows mass spectra with charge reduction.

FIG. 8 depicts the effect of charge state reduction on a mixture of three oligonucleotides, a 15 mer d(TGTAAAACGACGGCC), a 21 mer d(TGTAAAAC GACGGCCAGTGCC), and a 27 mer d(TGTAAAACGACGGCCAGTGCCAAGC TT), whereby FIG. 8-A shows mass spectra without charge reduction and FIG. 8-B shows mass spectra with charge reduction.

DETAILED DESCRIPTION OF THE INVENTION

Figure 1:
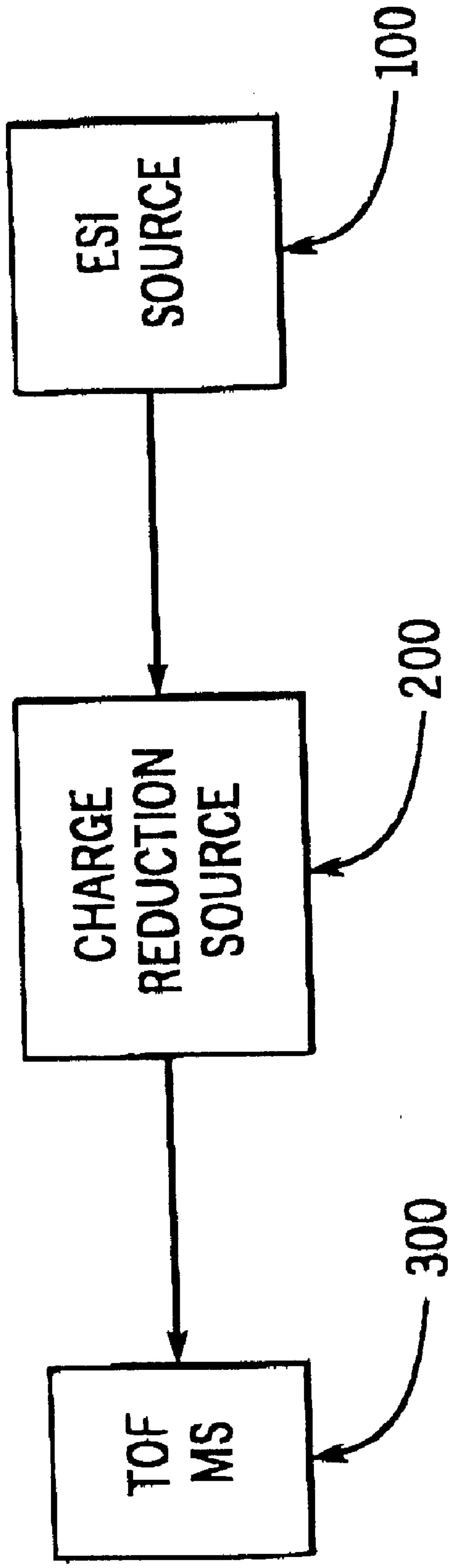
FIG. 1 is a block diagram of the apparatus used in the method of this invention.

An apparatus used in the method of the present invention comprises three primary components, depicted generally by the block diagrams of FIG. 1, wherein a positive-pressure ESI source 100 is operably linked to a charge reduction source 200, which is, in turn, operably linked to a time of flight mass spectrometer 300.

Figure 2:
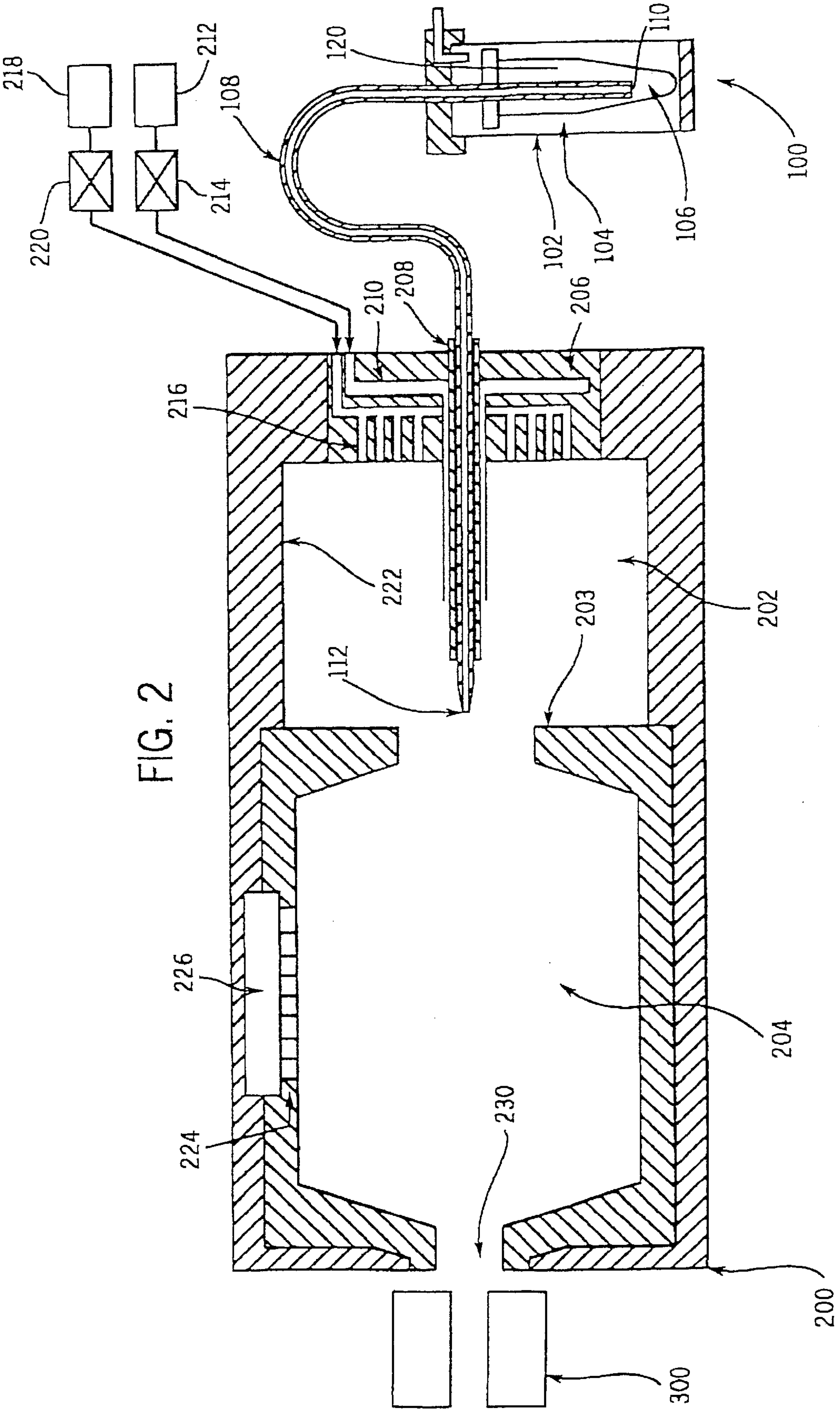
FIG. 2 is an expanded cross-sectional partial view of the apparatus used in the method of this invention.

Referring now to the ESI source 100 shown in FIG. 2, a protective casing 102 houses a 0.5 mL polypropylene vessel 104 within which a sample analyte 106 is placed. In the preferred embodiment, the ESI source 100 comprises a 24 cm fused-silica polyamide coated capillary 108 (150 mm o.d., 25 mm i.d.) having an inlet 110 at one end and a spray tip 112 at the other end.

As shown in FIG. 3, the spray tip 112 of the capillary 108 is conically ground to a cone angle 114 (angle between the capillary axis 116 and the cone surface 118) of approximately 25–35 degrees in order to form a nebulizer. Although many types of nebulizers are known, including ultrasonic, pneumatic, frit, and thermospray, an electrospray nebulizer is preferred because of its ability to generate small and uniform electrically charged droplets at its spray tip 112. Accordingly, FIG. 4 shows a front view of a spray tip 112 of an electrospray nebulizer, as taken along line 4—4 in FIG. 3.

Referring again to FIG. 2, the inlet 110 of the capillary 108 is immersed in a solution containing the sample analyte 106 whereby a pressurized gas cylinder applies a positive pressure of 7 psi (49 kpa) to the sample analyte 106 to produce typical flow rates of about 0.05 to about 2 $\mu$l/min through the capillary 108 into near-atmospheric pressure inside the charge reduction source 200. The analyte 106 is maintained at a high potential such as 4500 V (positive for positive ion mode, negative for negative ion mode) by means of a platinum electrode 120 immersed therein.

In a preferred embodiment, the charge reduction source 200 is cylindrical, preferably with a diameter of 1.9 cm and a length of 4.3 cm. The charge reduction source 200 comprises an upstream spray chamber 202 and an adjacent downstream charge neutralization chamber 204. The charge neutralization chamber is where partial neutralization occurs. In preferred embodiments, the neutralization chamber is a charge reduction chamber. Between the upstream spray chamber and the charge reduction chamber is an electrically-conductive, Teflon-coated plate or wall 203. The plate or wall 203 can be biased to attract newly formed charged droplets emerging from the spray tip 112 towards the charge reduction chamber 204.

The opposite end of the spray chamber 202 comprises a spray manifold 206 through which a plurality of orifices traverse. The capillary 108 of the ESI source 100 passes through one orifice and is held in place by support members 208. As the analyte 106 is sprayed out of the spray tip 112, it is stabilized against corona discharge by a sheath gas of $CO_2$, which typically flows between 0.1–4L/min through a stainless steel sheath/nebulizer gas inlet tube (1.5 mm i.d.) 210 that is concentric with the silica capillary 108. Typically, the sheath gas is monitored and controlled by a flow meter 212 and a filter 214 before delivery through the sheath gas inlet tube 210 and into the spray chamber 202.

The other orifices of the spray manifold 206 allow passage of a bath gas such as nitrogen, carbon dioxide, oxygen or medical air via a plurality of bath gas inlet tubes 216 through which the bath gas typically flows after passage through a flow meter 218 and filter 220. Typical flow rates are often 1–4 L/min.

In the ESI-MS technique, electrospray ionization occurs by spraying the analyte 106 at a controlled rate out of the spray tip 112, which is maintained at a high electric potential. Typical flow rates are of the order of 0.1–10 $\mu$/min. Via a voltage differential between the spray tip 112 and the internal walls 222 of the spray chamber 202, an electrostatic field is created whereby charges accumulate at the surface of the droplets emerging from the spray tip 112. Because solvent evaporates from each droplet as the droplets travel towards the charge reduction chamber 204, they shrink, and the charge density on each droplet surface increases until the Rayleigh limit is reached, at which point electrostatic Coulomb repulsion forces between the charges approach in magnitude the droplet's cohesive forces such as surface tension. The resulting instability causes a "Coulomb explosion" whereby the original droplet, sometimes referred to as the parent or primary droplet, disintegrates into smaller droplets, sometimes referred to as daughter droplets. As the parent droplet disintegrates into daughter droplets, a substantial proportion of the total charge is removed. And as the daughter droplets shrink further in the drying gas, they too quickly reach the Rayleigh limit and undergo their own Coulomb explosion to give way to even smaller droplets. It is believed that the droplets successively disintegrate following this cascade mechanism until the analyte 106 molecules contained in the droplet are entirely desorbed in the gas phase.

Flow of the $CO_2$ sheath gas through the sheath gas inlet tube 210 is controlled by the flow meter 212 to shield against corona discharge at the spray tip, and flow of the bath gas through the bath gas inlet tubes 216 is controlled by the flow meter 218 both to control the rate of movement of the droplets through the spray chamber 202 and to dry the droplets.

Within the charge reduction chamber 204, a 3.1 cm diameter hole is cut into the casing of the cylinder into which a Polonium or Polonium-like alpha emitting source 226 is attached. The alpha particles produced by radio isotopic sources such as $^{210}$Po and $^{241}$Am react with components of the sheath and bath gases, producing a variety of both positively and negatively charged ions (i.e., bipolar ions). The bipolar ions react with and partially neutralize other ionic species, such as the multiply charged analyte molecules from the ES ionization.

Hence, multiply charged analyte ions from the spray tip 112 entering the charge reduction chamber 204 rapidly lose their charge, yielding mostly singly charged and doubly charged species.

Two factors are important in determining the degree of charge neutralization occurring within the neutralizing chamber 204: the alpha particle flux from the radioactive source 226 and the dwell time of the aerosol particles in the charge reduction chamber 204. The alpha particle flux is controlled by an alpha source attenuator 224 that can shield the alpha source 226 from the charge reduction chamber 204. For example, in a preferred embodiment, the alpha particle flux is modulated by placing a plurality of thin (i.e., typically 0.005 inches thick) brass disks with various numbers of holes of known areas drilled therein between the $^{210}$Po source 226 and the charge reduction chamber 204, whereby the alpha source 226 is completely shielded by a brass disk with no holes, and is shielded proportionally to the exposed surface area when holes are present in the disks.

As previously discussed, the dwell time of the aerosol particles can be controlled by varying the flow rate of the bath gas through the bath gas inlet tubes 216. For example, by varying the flow rate of the bath gas, a lower flow rate of bath gas leads to longer dwell time and more extensive neutralization and a higher flow rate of bath gas leads to shorter dwell time and less extensive neutralization. By balancing the dwell time with the alpha particle source exposure, a charge distribution of the aerosol is selected, whereby the bath gas ions and alpha particles reduced the multiply charged macromolecule particles to predominantly singly and no-charge macromolecule particles. This balance will permit analysis of mixture spectra.

Figure 5:
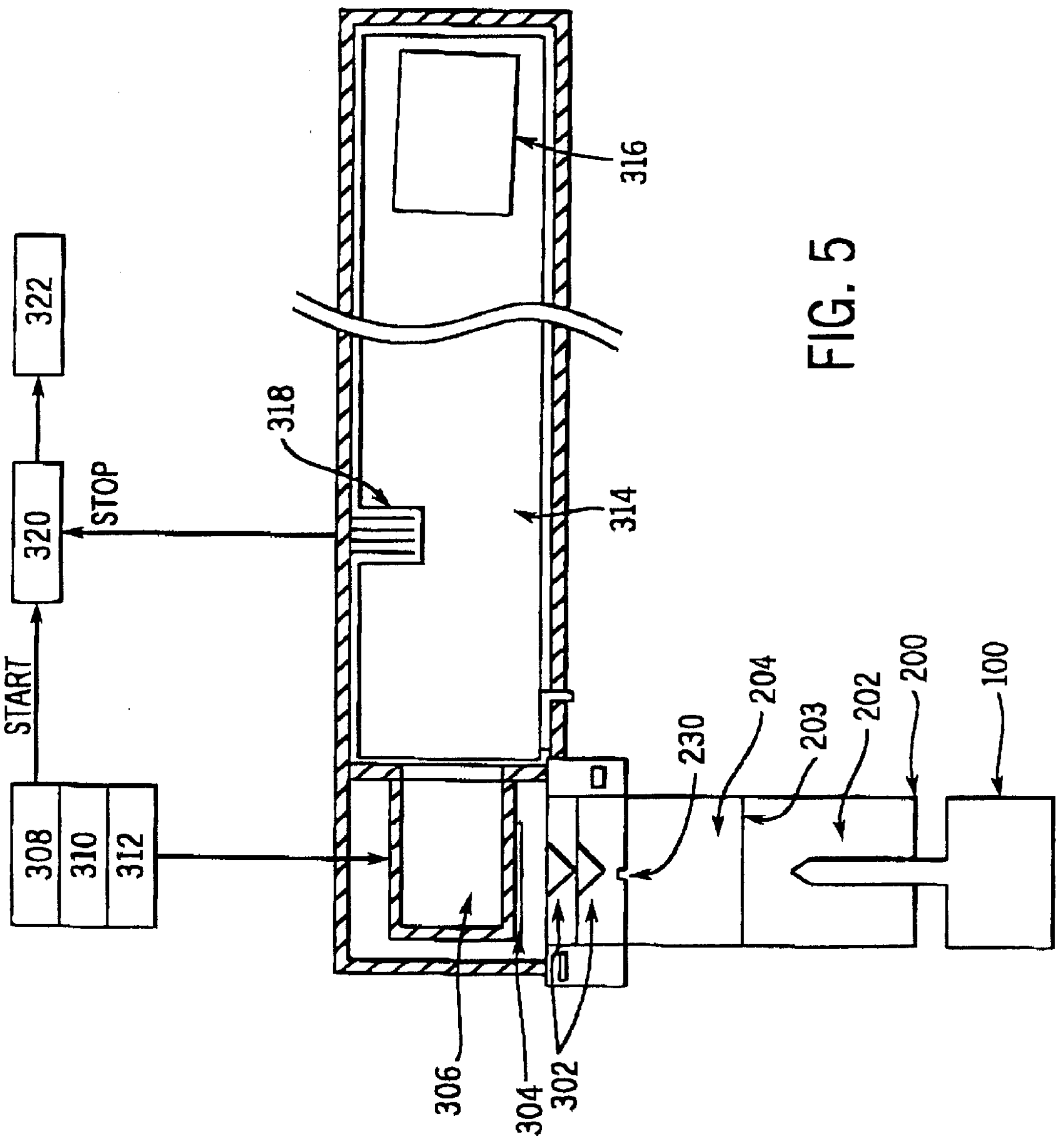
FIG. 5 is a simplified cross-sectional view of an embodiment including an orthogonal time of flight mass spectrometer used in the method of electrospray analysis of the present invention.

Referring now to the preferred embodiment in FIG. 5, the neutralized aerosol exits the charge reduction chamber 204 through a 3 mm diameter outlet 230. A portion of this aerosol enters the mass spectrometer through the MS atmospheric pressure to vacuum interface for subsequent analysis.

The approach described herein is readily implemented by simple modification to the ESI source, and it is thus adaptable to virtually any mass analyzer. However, the high mass of common proteins and nucleic acids can quickly exceed the m/z ranges accessible with most mass analyzer instruments, and for this reason, an orthogonal TOF system is preferred because of the high intrinsic m/z range of this type of analyzer. For example, the reduction of charge state described above necessarily increases the m/z ratio of the ions being analyzed. In conventional ESI-MS, even very large molecules (i.e., megadaltons in size) are produced with m/z ratios below 4,000, enabling analysis thereof with a variety of mass analyzers. However, with mixture charge reduction, the relatively high mass of common proteins and nucleic acids can quickly exceed the m/z range accessible with most instrument configurations. An orthogonal time-of-flight mass spectrometer, on the other hand, is characterized by the very high intrinsic m/z range of TOF analysis. For instance, the mass spectrometer 300 in a preferred embodiment is the commercially available PerSeptive Biosystems Mariner Workstation, an orthogonal TOF mass spectrometer with a m/z range of 25,000 amu and a measured external mass accuracy of better than 10 ppm.

In the preferred embodiment, the chosen analyzer 300 is interfaced to the charge reduction source 200 through a plurality of skimmer orifices, allowing the transport of the aerosol from atmospheric pressure into the high vacuum region of the spectrometer 302. The skimmer orifices 302 are further connected to a plurality of focusing and pulsing elements. A quadrupole focusing lens 304 is used to initially focus the ions. The focused ion packets are accelerated down an electric field free region 314 via a series of ion optic elements and pulsing electronics 306, 308, 310, and 312.

All ions receive the same kinetic energy as a result of this process. The kinetic energy is proportional to the product of the mass and velocity of the ion, thus heavier ions will travel slower than lighter ions. Hence, the arrival times of the ions at the end of the flight tube are separated in time proportional to their mass. The arrival of the ions is typically detected with a microchannel-based detector, the output signal of which can be measured as a function of time by a 1.3 Ghz time-to-digital converter 320. The appropriate time measurements are transmitted for storage into and analysis by a computer 322.

Using a calibrant of known molecular mass, the computer 322 can derive the mass of the arriving ions by converting flight times to molecular weights. By techniques known in the art, the computer can be programmed to run software that outputs the mass spectra as smoothed by convolution with a Gaussian function. Resultant mass spectra are depicted in the graphs of FIGS. 6–8, whereby mass (measured in units corresponding to m/z) is depicted on the x-axis and intensity (measured in arbitrary units) is depicted on the y-axis.

With reference now to FIG. 6, a series of positive ion mass spectra was obtained in the analysis of the protein ubiquitin (8564.8 Amu; 5 $\mu$M in 1:1 $H_2O$:acetonitrile, 1% acetic acid) at increasing levels of exposure to the $^{210}$Po particle source 226. The averaged mass spectra shown were obtained over a 250 second time period at a spectral acquisition rate of 10 kHZ, consuming 0.54 $\mu$L (2.7 pmol) of sample.

As shown in FIG. 6-A, with the $^{210}$Po source 226 completely shielded, a typical ESI charge distribution is observed, with six major charge states evident (+7 to +2) and with the peak of the distribution corresponding to the +5 charge state. As shown in FIG. 6-B, where the degree of exposure to the $^{210}$Po source 226 was increased to 17.5% by using a different alpha source attenuator 224, the charge state distribution moved toward lower and fewer charge states, until, as shown in FIG. 6-C, with the $^{210}$Po source 226 completely unshielded, only two major charge states were observed, with the major peak corresponding to the +1 charge state. This result demonstrates the feasibility of obtaining high resolution TOF mass spectra by controlling the charge state by way of varying macromolecule exposure to radioactive ionizing sources 226 such as Polonium.

The effect of charge reduction on the analysis of a simple protein mixture by time-of-flight ESI-MS is shown in FIG. 7. An equimolar mixture of three proteins (insulin, 5733.5 amu; ubiquitin, 8564.8 amu; and cytochrome c, 12360 amu) was prepared and mass analyzed with and without charge reduction. The mass spectra shown were obtained over a 250 second time period at a spectral acquisition rate of 10 kHz, consuming 0.54 $\mu$L (2.7 pmol) of sample.

The result obtained in the absence of charge reduction is shown in FIG. 7-A, which corresponds to a fairly typical ESI mass spectrum for such a mixture. The mass spectrum is complex, containing about 50 peaks, 18 of which correspond to the various charge states of the proteins as shown in the figure. In contrast, the spectrum shown in FIG. 7-B exhibits only eight major peaks, which are readily assigned by those skilled in the art. This result demonstrates the heretofore unknown reduction of spectral complexity in mixture analysis afforded by charge reduction. In FIG. 7-B, the absence of the acetate adduct on the +2 charge state of cytochrome c can be attributed to collision activated dissociation (CAD) in the region proximal to the skimmer orifices 302.

Finally, the effect of charge reduction on the analysis of a simple oligonucleotide mixture by the method of this invention is shown in FIG. 8. An equimolar mixture of three oligonucleotides 15, 21, and 27 nucleotides in length was prepared and mass analyzed with and without charge reduction. Each oligonucleotide was at a concentration of 10 μM in 3:1 $H_2O$:$CH_3OH$, 400 mM 1,1,1,3,3,3-hexafluoro-2-propanol (HFIP), adjusted to pH 7 with triethylamine. The HFIP buffer was found to yield the least $Na^+$ and $K^+$ oligonucleotide adduction of any buffer tested and was used for that reason. The averaged mass spectra shown were obtained over a 500 second time period at a spectral acquisition rate of 10 kHz, consuming 1.08 μL (5.4 pmol) of sample.

The result obtained in the absence of charge reduction (i.e., with the $^{210}$Po source 226 fully shielded) is shown in FIG. 8-A. Without charge reduction, the ESI mass spectrum obtained for such a mixture yields a complex spectra, with overlapping peaks corresponding to several different charge states for the three oligonucleotides in the mixture. Many other peaks due to fragmentation are also observed. Analysis of the spectra of such a mixture is compromised by the variety of charge states present in the sample, yielding too many overlapping spectrum peaks to permit effective discrimination amongst the various species present. The effect of charge reduction, on the other hand, is shown in FIG. 8-B, in which charge reduction greatly simplifies the mass spectrum, with only six major peaks evident, corresponding to the singly and doubly charged ions for each oligonucleotide.

All of the unreduced charge spectra (FIGS. 6-A, 7-A, and 8-A) show a number of peaks in the low m/z region that do not correspond to charge states of the analytes, but that disappear in the charge-reduced spectra (FIGS. 6-B, 7-B, and 8-B). The m/z ratios and isotopic distributions of these peaks correspond predominantly to singly charged fragment ions, with only a few multiply charged fragment ions (assignments not shown). The disappearance of these peaks with charge reduction is advantageous in a practical sense because it constitutes a substantial reduction in the "chemical noise" of the system.

Because the charge reduction process may convert a fraction of analyte ions into neutral species that are not detected by the analyzer 300, the signal intensities in the charge-reduced spectra may be lower than those in the non charge-reduced spectra. Conversely, however, the reduction in chemical noise described above and the simplification of the spectra both tend to increase detection sensitivity.

EXAMPLE

Analysis of Polyethelene Glycol Polymers

The use of the present invention for detecting and quantifying commercial organic polymer samples was demonstrated by analyzing liquid solutions containing known quantities of polyethelene glycol polymers (PEG) samples using charge reduction techniques with electrospray ionization—time of flight mass spectrometry (ES-TOF/MS). Two PEG samples were analyzed and each comprised a distribution of PEG polymers of varying lengths characterized by an average molecular weight. Specifically, a solution containing two PEG samples with average molecular weights corresponding to 2,000 Da and 10,000 Da, respectively, was analyzed by employing positive mode electrospray discharge in combination with charge reduction using a $^{210}$Po radioactive reagent ion source. The $^{210}$PO radioactive reagent ion source comprised two polonium discs, each with an output of 5 millicurie. Specifically, FIG. 9 presents positive ion mass spectra observed upon electrospray discharge of 0.05 μg/μl samples in a 50:50 methanol to water solution with and without charge reduction. The averaged mass spectra shown represent experimental conditions of a 500 s sampling interval at a spectral acquisition rate of 10 kHz. Each run consumed 0.17 μl/min. of sample and the spectra shown are the result of smoothing the raw spectrum by a convolution with a Gaussian function.

Figure 9A:
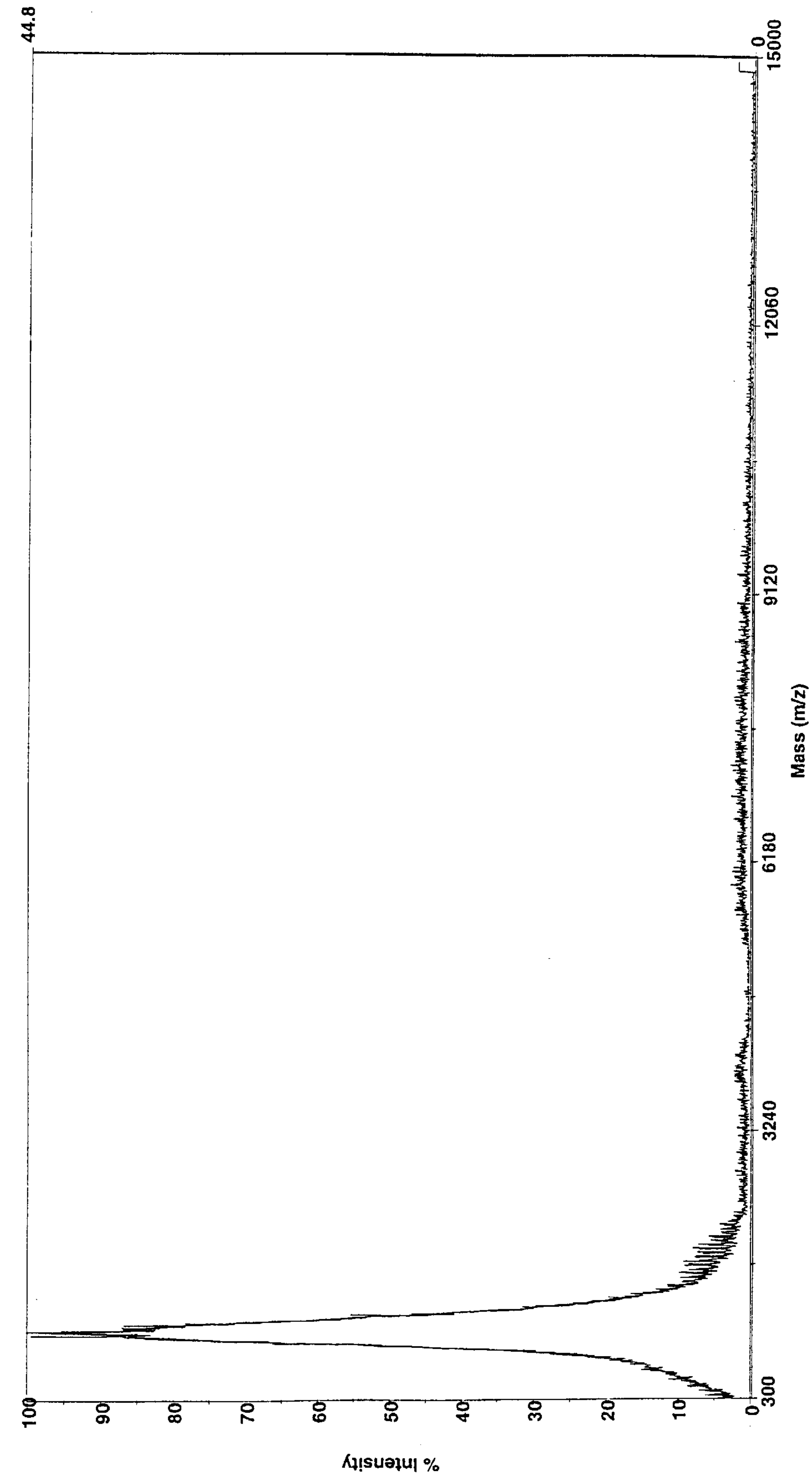
FIG. 9A is an exemplary ES-TOF/MS of a polymer sample containing two components (one 10,000 Da and the other 2,000 Da). The composition of neither polymer is readily identifiable.

FIG. 9A shows the spectrum obtained for analysis of a solution containing 10,000 Da and 2,000 average molecular weight polymer samples with the $^{210}$Po radioactive reagent ion source completely shielded. In this configuration, no ionizing radiation generated by the $^{210}$Po radioactive reagent ion source was able to pass into the field desorption-charge reduction region. The spectrum in FIG. 9A is typical for the ES-TOF/MS analysis of samples containing PEG polymer analytes and is primarily characterized by a large single peak centered around 1,000 m/z. The central peak at 1,000 m/z may be attributed to proportionate multiple charging of analyte ions generated from both PEG samples. As shown in FIG. 9A, the composition of neither PEG sample in the mixture is readily identifiable within the convoluted bundle of overlapping peaks. Accordingly, the size distribution of the PEG samples cannot be resolved or quantified.

Figure 9B:
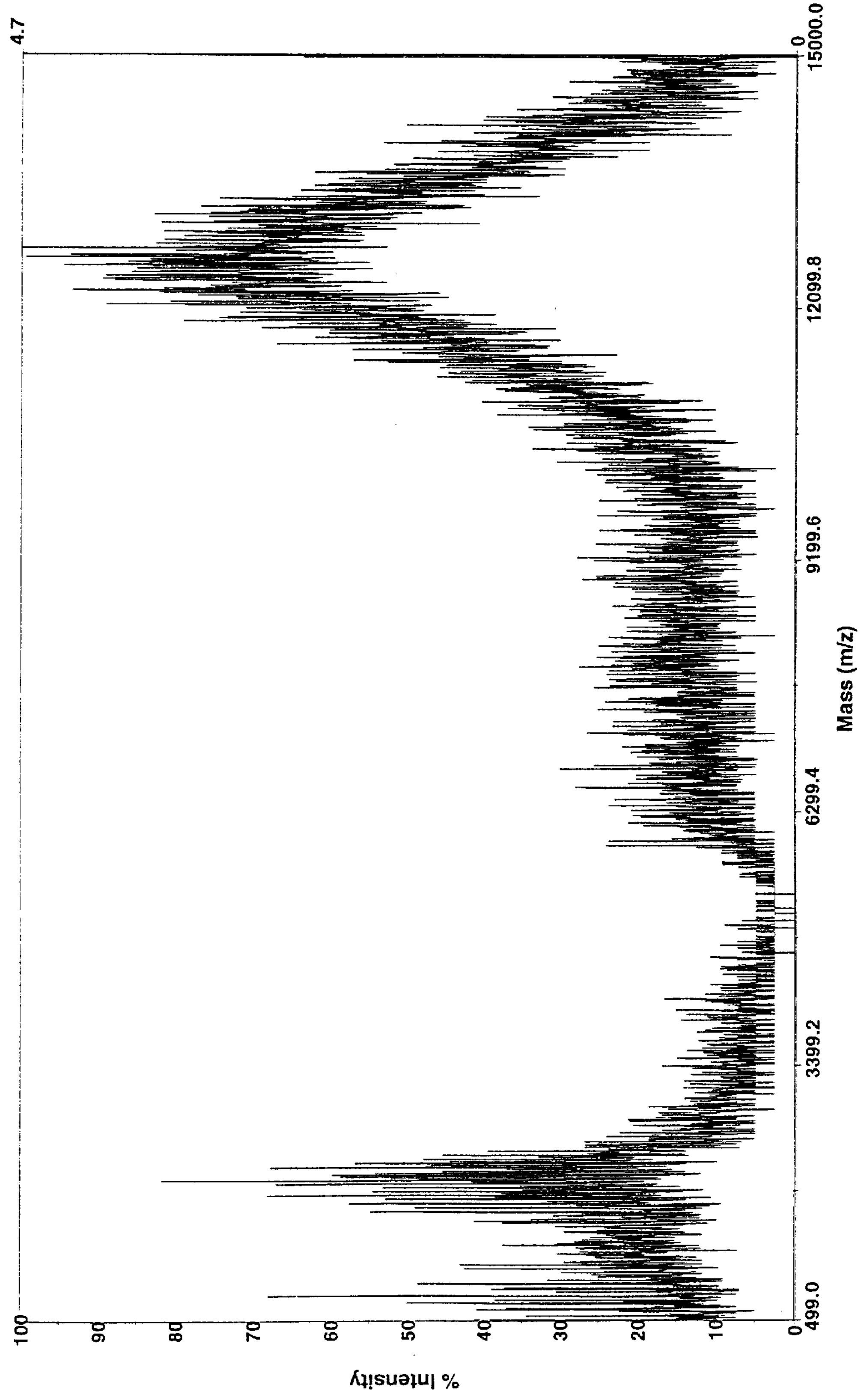
FIG. 9B is a TOF/MS of the same two polymer components employing a $^{210}$Po radioactive reagent source. The size distribution of each polymer sample is readily discernible.

In contrast, FIG. 9B shows a spectrum obtained for the electrospray discharge of the same PEG sample wherein the radiative flux attenuator element was adjusted to allow the full flux of ionizing radiation generated by the $^{210}$Po radioactive reagent ion source to pass into the field desorption-charge reduction region. The spectrum in 9B is characterized by two series of peaks centered around 2,000 m/z and 10,000 m/z corresponding to each PEG sample in the mixture. As demonstrated in FIG. 9B, charge reduction employing a $^{210}$Po radioactive reagent ion source resulted in generation of gas phase PEG analyte ions primarily consisting of singly charged ions. Accordingly, the size distribution of each PEG sample dissolved in solution is readily discernible in FIG. 9B. The series of peaks that center around 2,000 m/z corresponds to the distribution of polymers present in the 2,000 Da average molecular weight sample and the series of peaks that center around 10,000 m/z corresponds to the distribution of polymers present in the 10,000 Da average molecular weight sample. The application of charge reduction for the analysis of PEG polymer samples not only resolves the identity of individual polymers present in each sample, but also provides measurement of the amount of each polymer of different length comprising the distribution.

Further experiments have indicated that the degree of charge reduction achieved upon the electrospray discharge of solutions containing PEG samples is adjustable by varying the flux of ionizing radiation into the field desorption-charge reduction region. Accordingly, the present invention provides an ion preparation technique in which the charge state distribution is selectively adjustable. This aspect of the present invention may be of particular importance in the analysis of polymers that possess sizes extending beyond the range of commercially available mass spectrometers. Accordingly, the devices and methods of the present invention may be useful in the analysis of extremely high molecular weight compounds by working under experimental conditions yielding primarily doubly, triply or quadruply charged analyte ions.

Although the description above contains many specifics, these should not be construed as limiting the scope of the invention but as merely providing illustrations of some of the presently-preferred embodiments of this invention. Thus, the scope of the invention should be determined by the appended claims and their legal equivalents, rather than by the examples given.

The spirit of the present invention is not limited to any embodiment described above. Rather, the details and features of an exemplary embodiment were disclosed as required. Without departing from the scope of this invention, other modifications will therefore be apparent to those skilled in the art. Thus, it must be understood that the detailed description of the invention and drawings were intended as illustrative only, and not by way of limitation.

To apprise the public of the scope of this invention, the following claims are made:

We claim:

1. A device for determining the identity and concentration of macromolecules in a sample analyte solution containing at least one macromolecule in at least one solvent, said device comprising:

a) an electrospray ionization source for producing a plurality of multiply charged analyte droplets of the sample analyte solution in a flow of bath gas, wherein at least partial evaporation of solvent from the droplets results in the formation of a plurality of multiply charged macromolecule particles in the flow of bath gas;

b) a charge reduction chamber cooperatively connected to the electrospray ionization source for receiving the flow of bath gas, charged analyte droplets and multiply charged macromolecule particles, wherein the macromolecule particles remain in the charge reduction chamber for a selected residence time;

c) a radioactive source operationally connected to said charge reduction chamber that emits particles into the charge reduction chamber, wherein said particles emitted by the radioactive source ionize at least a portion of the bath gas to generate bipolar ions within at least a portion of the volume of the charge reduction chamber, wherein said bipolar ions react with the macromolecule particles having multiple charges to reduce their charge state;

d) a radiative flux attenuator element positioned between the charge reduction chamber and the radioactive source for reducing the flux of particles into the charge reduction chamber; and e) a mass spectrometer operationally connected to said charge reduction chamber, for analyzing said macromolecule particles;

wherein the residence time of droplets, macromolecule particles or both and the concentration of bipolar ions in the charge reduction chamber is adjusted to control the charge distribution of the macromolecule particles.

2. The device of claim 1 wherein the radiative flux attenuator element is adjustable to select the flux of particles into the charge reduction chamber.

3. The device of claim 1 wherein the radiative flux attenuator element comprises a plurality of brass discs possessing a plurality of holes drilled therethrough.

4. The device of claim 1 wherein the radioactive source emits alpha particles.

5. The device of claim 4 wherein the radioactive source is selected from the group consisting of;

(a) a $^{210}$Po radio isotope source; and (b) a $^{241}$Am radio isotope source.

6. An ion source for preparing gas phase analyte ions from a liquid sample, containing chemical species in a solvent, carrier liquid or both, wherein the charge-state distribution of the gas phase analyte ions prepared may be selectively adjusted, said device comprising:

(a) an electrically charged droplet source for generating a plurality of electrically charged droplets of the liquid sample in a flow of bath gas;

(b) a field desorption-charge reduction region of selected length, cooperatively connected to the electrically charged droplet source and positioned at a selected distance downstream with respect to the flow of bath gas, for receiving the flow of bath gas and electrically charged droplets, wherein at least partial evaporation of the solvent, carrier liquid or both from the droplets generates gas phase analyte ions and wherein the charged droplets, analyte ions or both remain in the field desorption-charge reduction region for a selected residence time;

(c) a radioactive reagent ion source, operationally connected to the field desorption-charge reduction region, for providing a flux of ionizing radiation into the field desorption-charge reduction region, whereby electrons, reagent ions or both are generated from the bath gas within at least a portion of the field desorption-charge reduction region, whereby the electrons, reagent ions or both react with droplets, analyte ions or both in the flow of bath gas within at least a portion of the field desorption-charge reduction region to reduce the charge-state distribution of the analyte ions in the flow of bath gas and generate gas phase analyte ions having a selected charge-state distribution; and (d) a radiative flux attenuator element positioned between the radioactive reagent ion source and the field desorption-charge reduction region for selectively adjusting the flux of ionizing radiation into the field desorption-charge reduction region;

wherein the residence time of droplets, analyte ions or both, the flux of ionizing radiation into the field desorption-charge reduction region, the abundance of electrons, reagent ions, or both in the field desorption-charge reduction region, type of bath gas, regent ion or both or any combinations thereof is adjusted to control the charge-state distribution of the gas phase analyte ions.

7. The ion source of claim 6 comprising at least one flow inlet, cooperatively connected to said electrically charged droplet source, for the introduction of bath gas into said field desorption-charge reduction region.

8. The ion source of claim 6 wherein said electrically charged droplet source is selectively positionable along the axis of said flow of bath gas to provide adjustable selection of the distance between the electrically charged droplet source and the radioactive reagent ion source.

9. The ion source of claim 6 wherein said radioactive reagent ion source emits alpha particles.

10. The ion source of claim 9 wherein said radioactive reagent ion source is selected from the group consisting of:

(a) a $^{210}$Po radio isotope source; and (b) a $^{241}$Am radio isotope source.

11. The ion source of claim 6 wherein the ionizing radiation is selected from the group consisting of:

(a) $\alpha$ rays;

(b) $\beta$ rays;

(c) $\gamma$ rays;

(d) x-rays;

(e) protons; and (f) neutrons.

12. The ion source of claim 6 wherein the radiative flux attenuator element is adjustable to select the flux of ionizing radiation into the charge reduction chamber.

13. The device of claim 6 wherein the radiative flux attenuator element comprises at least one brass disc possessing a plurality of holes drilled therethrough.

14. The device of claim 6 wherein the radiative flux attenuator element comprises at least one metal screen.

15. The ion source of claim 6 wherein said electrically charged droplet source is selected from the group consisting of:

(a) a positive pressure electrospray source;

(b) a pneumatic nebulizer;

(c) a piezo-electric pneumatic nebulizer;

(d) a thermospray vaporizer;

(e) an atomizer;

(f) an ultrasonic nebulizer; and (g) a cylindrical capacitor electrospray source.

16. The ion source of claim 6 wherein the reagent ions comprise positively charged ions and negatively charged ions.

17. The ion source of claim 6 wherein said chemical species are selected from the group consisting of:

(a) one or more oligopeptides;

(b) one or more oligonucleotides;

(c) one or more carbohydrates; and (d) one or more synthetic polymers.

18. An ion source for preparing gas phase analyte ions from a liquid sample, containing chemical species in a solvent, carrier liquid or both, wherein the charge-state distribution of the gas phase analyte ions prepared may be selectively adjusted, said device comprising:

(a) an electrically charged droplet source for generating of a plurality of electrically charged droplets of the liquid sample in a flow of bath gas;

(b) a field desorption region of selected length, cooperatively connected to the electrically charged droplet source, for receiving the flow of bath gas and electrically charged droplets, wherein at least partial evaporation of solvent, carrier liquid or both from the droplets generates gas phase analyte ions and wherein the charged droplets, analyte ions or both remain in the field desorption region for a first selected residence time;

(c) a charge reduction region of selected length, cooperatively connected to the field desorption region and positioned at a selected distance downstream with respect to the flow of bath gas from the electrically charged droplet source, for receiving the flow of bath gas, charged droplets and gas phase analyte ions, wherein the charged droplets, analyte ions or both remain in the charge reduction region for a second selected residence time;

(d) a radioactive reagent ion source, operationally connected to the charge reduction region, for providing a flux of ionizing radiation into the charge reduction region, whereby electrons, reagent ions or both are generated from the bath gas within at least a portion of the field desorption-charge reduction region, whereby the electrons, reagent ions or both react with droplets, analyte ions or both in the flow of bath gas within at least a portion of the charge reduction region to reduce the charge-state distribution of the analyte ions in the flow of bath gas and generate gas phase analyte ions having a selected charge-state distribution; and (e) a radiative flux attenuator element positioned between the radioactive reagent ion source and the charge reduction region for selectively adjusting the flux of ionizing radiation into the charge reduction region;

wherein the residence time of droplets, analyte ions or both in the charge reduction region, the flux of ionizing radiation into the charge reduction region, the abundance of electrons, reagent ions, or both in the charge reduction region, type of bath gas, regent ion or both or any combinations thereof is adjusted to control the charge-state distribution of the gas phase analyte ions.

19. The ion source of claim 18 wherein the field desorption region is substantially free of reagent ions.

20. The ion source of claim 18 wherein the reagent ions comprise positively charged ions and negatively charged ions.

21. A device for determining the identity and concentration of chemical species in a liquid sample containing the chemical species in a solvent, carrier liquid or both, said device comprising:

(a) an electrically charged droplet source for generating of a plurality of electrically charged droplets of the liquid sample in a flow of bath gas;

(b) a field desorption-charge reduction region of selected length, cooperatively connected to the electrically charged droplet source and positioned at a selected distance downstream with respect to the flow of bath gas, for receiving the flow of bath gas and electrically charged droplets, wherein at least partial evaporation of solvent, carrier liquid or both from the droplets generates gas phase analyte ions and wherein the charged droplets, analyte ions or both remain in the field desorption-charge reduction region for a selected residence time;

(c) a radioactive reagent ion source, operationally connected to the field desorption-charge reduction region, for providing a flux of ionizing radiation into the field desorption-charge reduction region, whereby electrons, reagent ions or both are generated from the bath gas within at least a portion in the field desorption-charge reduction region, whereby the electrons, reagent ions or both react with droplets, analyte ions or both in the flow of bath gas within at least a portion of the field desorption-charge reduction region to reduce the charge-state distribution of the analyte ions in the flow of bath gas and generate gas phase analyte ions having a selected charge-state distribution;

(d) a radiative flux attenuator element positioned between the radioactive reagent ion source and the field desorption-charge reduction region for selectively adjusting the flux of ionizing radiation into the field desorption-charge reduction region; and (e) a charged particle analyzer operationally connected to said field desorption-charge reduction region, for analyzing said gas phase analyte ions;

wherein the residence time of droplets, analyte ions or both in the field desorption-charge reduction region, the flux of ionizing radiation into the field desorption-charge reduction region, the abundance of electrons, reagent ions, or both in the field desorption-charge reduction region, type of bath gas, regent ion or both or any combinations thereof is adjusted to control the charge-state distribution of the gas phase analyte ions.

22. The device of claim 21 wherein said charged particle analyzer comprises a time of flight mass spectrometer positioned along an axis orthogonal to the axis of said flow of bath gas.

23. The device of claim 21 wherein said charge particle analyzer is selected from the group consisting of:

(a) an ion trap;

(b) a quadrupole mass spectrometer;

(c) a tandem mass spectrometer; and (d) residual gas analyzer.

24. A method for preparing gas phase analyte ions from a liquid sample, containing chemical species in a solvent, carrier liquid or both, wherein the charge-state distribution of the gas phase analyte ions prepared may be selectively adjusted, said method comprising the steps of:

a) producing a plurality of electrically charged droplets of the liquid sample in a flow of bath gas;

b) passing the flow of bath gas and droplets through a field desorption-charge reduction region of selected length, wherein at least partial evaporation of solvent, carrier liquid or both from droplets generates gas phase analyte ions and wherein the charged droplets, analyte ions or both remain in the field desorption-charge reduction region for a selected residence time;

c) exposing the droplets, gas phase analyte ions or both to electrons, reagent ions or both generated from bath gas molecules by a radioactive reagent ion source and radiative flux attenuator, wherein the radiative flux attenuator is positioned between the radioactive reagent ion source and the field desorption-charge reduction region and is capable of selectively adjusting the flux of ionizing radiation into the field desorption-charge reduction region, wherein the electrons, reagent ions or both react with said droplets, charged droplets or both within at least a portion of the field desorption-charge reduction region to reduce the charge-state distribution of the analyte ions in the flow of bath gas thereby generating gas phase analyte ions having a selected charge-state distribution; and d) controlling the charge-state distribution of said gas phase analyte ions by adjusting the residence time of droplets, analyte ions or both, the abundance of electrons, reagent ions, or both, the type of bath gas, the type of reagent ion or both or any combinations thereof.

25. A method for determining the identity and concentration of chemical species in a liquid sample containing the chemical species in a solvent, carrier liquid or both, said method comprising:

a) producing a plurality of electrically charged droplets of the liquid sample in a flow of bath gas;

b) passing the flow of bath gas and droplets through a field desorption-charge reduction region of selected length, wherein at least partial evaporation of solvent, carrier liquid or both from droplets generates gas phase analyte ions and wherein the charged droplets, analyte ions or both remain in the field desorption-charge reduction region for a selected residence time;

c) exposing the droplets, gas phase analyte ions or both to electrons, reagent ions or both generated from bath gas molecules by a radioactive reagent ion source and radiative flux attenuator, wherein the radiative flux attenuator is positioned between the radioactive reagent ion source and the field desorption-charge reduction region and is capable of selectively adjusting the flux of ionizing radiation into the field desorption-charge reduction region, wherein the electrons, reagent ions or both react with said droplets, charged droplets or both within at least a portion of the field desorption-charge reduction region to reduce the charge-state distribution of the analyte ions in the flow of bath gas thereby generating gas phase analyte ions having a selected charge-state distribution; and d) controlling the charge-state distribution of said gas phase analyte ions by adjusting the residence time of droplets, analyte ions or both, the abundance of electrons, reagent ions, or both, the type of bath gas, the type of reagent ion or both or any combinations thereof; and e) analyzing said gas phase analyte ions with a charged particle analyzer.

* * * * *

UNITED STATES PATENT AND TRADEMARK OFFICE
CERTIFICATE OF CORRECTION

PATENT NO. : 6,727,497 B2
DATED : April 27, 2004
INVENTOR(S) : Scalf et al.

It is certified that error appears in the above-identified patent and that said Letters Patent is hereby corrected as shown below:

Column 1,
Line 9, please add the following title and paragraph:

-- STATEMENT REGARDING FEDERALLY SPONSORED RESEARCH OR DEVELOPMENT

This invention was made with United States Government support awarded by the following agencies NIH HG00321. The United States has certain rights in this invention. --.

Column 15,
Line 64, please delete "device" and replace with -- ion source --.

Column 17,
Line 27, please delete "device" and replace with -- ion source --.
Line 55, please delete "field desorption".

Column 19,
Line 28, please delete "adjusting the flux" and replace with -- adjusting a flux --.

Column 20,
Line 21, please delete "adjusting the flux" and replace with -- adjusting a flux --.
Line 30, please delete "and".

Signed and Sealed this

Nineteenth Day of October, 2004

JON W. DUDAS
*Director of the United States Patent and Trademark Office*